US012673496B2

(12) United States Patent
Suzuki et al.

(10) Patent No.: US 12,673,496 B2
(45) Date of Patent: Jul. 7, 2026

(54) LIQUID EJECTION APPARATUS

(71) Applicant: CANON KABUSHIKI KAISHA, Tokyo (JP)

(72) Inventors: Tetsuji Suzuki, Kanagawa (JP); Seiji Suzuki, Kanagawa (JP); Ryosuke Araki, Kanagawa (JP); Takaya Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 18/356,566

(22) Filed: Jul. 21, 2023

(65) Prior Publication Data

US 2024/0034065 A1 Feb. 1, 2024

(30) Foreign Application Priority Data

Jul. 27, 2022 (JP) ................................ 2022-119994

(51) Int. Cl.

*B41J 2/165* (2006.01)
*B41J 25/304* (2006.01)

(52) U.S. Cl.

CPC ....... *B41J 2/16508* (2013.01); *B41J 2/16511* (2013.01); *B41J 2/16535* (2013.01); *B41J 2/16538* (2013.01); *B41J 2/16544* (2013.01); *B41J 25/304* (2013.01); *B41J 2/16532* (2013.01); *B41J 2/16585* (2013.01)

(58) Field of Classification Search

CPC ................ B41J 2/16508; B41J 2/16511; B41J 2/16535; B41J 2/16538; B41J 2/16544; B41J 25/304; B41J 2/16532; B41J 2/16585

See application file for complete search history.

(56) References Cited

U.S. PATENT DOCUMENTS

| | | | |
|---|---|---|---|
| 2016/0046128 A1 | 2/2016 | Tanda | |
| 2019/0299618 A1* | 10/2019 | Fukunaga | ............ B41J 2/16585 |

FOREIGN PATENT DOCUMENTS

| | | | |
|---|---|---|---|
| EP | 2481587 | B1 | 9/2014 |
| EP | 3875279 | A1 | 9/2021 |
| JP | 2011240550 | A | 12/2011 |
| JP | 2012157989 | A | 8/2012 |
| JP | 2014065261 | A | 4/2014 |
| JP | 2021098330 | A | 7/2021 |
| JP | 2023053537 | A | 4/2023 |
| WO | 2020090425 | A | 5/2020 |

* cited by examiner

*Primary Examiner* — Geoffrey S Mruk
(74) *Attorney, Agent, or Firm* — Canon U.S.A., Inc. I.P. Division

(57) ABSTRACT

A liquid ejection apparatus includes an ejection head configured to include an ejection port surface in which ejection ports for ejecting liquid are arranged, a cap configured to be movable to a capping position where the ejection port surface is capped, and to an uncapped position where the ejection port surface is not capped, and a cleaning mechanism configured to be movable, independently of the cap, to a cleaning position where the ejection head is cleaned, and to a standby position where the ejection head is not cleaned. The cap at the uncapped position is positioned above the cleaning mechanism at the standby position.

16 Claims, 20 Drawing Sheets

LIQUID EJECTION APPARATUS

BACKGROUND OF THE INVENTION

Field of the Invention

The present invention relates to a liquid ejection apparatus for ejecting liquid.

Description of the Related Art

Inkjet recording apparatuses are a type of liquid ejection apparatus. They each include a recording head provided with nozzles that each contain ink that can lose moisture, causing its thickening or solidification. Further, paper dust or air bubbles can enter a nozzle of the recording head, resulting in an ejection failure. To address those issues, inkjet recording apparatuses generally perform cleaning of their recording heads.

Japanese Patent Application Laid-Open No. 2011-240550 discloses a configuration in which a cleaning mechanism for cleaning the nozzle surface of a recording head and a cap for covering the nozzle surface are integrally arranged as a cleaning unit. The cleaning unit in Japanese Patent Application Laid-Open No. 2011-240550 includes the cleaning mechanism and the cap arranged side by side in a sheet width direction.

However, the arrangement of the cleaning mechanism and the cap side by side in the sheet width direction, and configured to move integrally, as described in Japanese Patent Application Laid-Open No. 2011-240550 may result in the apparatus being configured with a larger dimension in the sheet width direction.

SUMMARY OF THE INVENTION

In view of the above issues, the present invention is directed to providing a liquid ejection apparatus to prevent an apparatus from being large in size.

According to an aspect of the present invention, a liquid ejection apparatus includes an ejection head configured to include an ejection port surface in which ejection ports for ejecting liquid are arranged, a cap configured to be movable to a capping position where the ejection port surface is capped, and to an uncapped position where the ejection port surface is not capped, and a cleaning mechanism configured to be movable, independently of the cap, to a cleaning position where the ejection head is cleaned, and to a standby position where the ejection head is not cleaned. The cap at the uncapped position is positioned above the cleaning mechanism at the standby position.

Further features of the present invention will become apparent from the following description of embodiments with reference to the attached drawings.

DESCRIPTION OF THE EMBODIMENTS

Hereinafter, a first embodiment of the present invention will be described with reference to the drawings. The following embodiments are not intended to limit the present invention, and not all combinations of features described in the embodiments are used as solving means of the present invention. In addition, for example, relative arrangements and shapes of constituent elements described in the embodiments are merely examples, and the scope of the present invention is not intended to be limited thereto. In each drawing, arrows x and y indicate horizontal directions orthogonal to each other, and an arrow z indicates a vertical direction (gravity direction).

<Liquid Ejection Apparatus>

It should be understood that "recording" is not limited to the case of forming significant information such as characters and graphics. The term "recording" broadly includes a case where, for example, an image, a design, or a pattern is formed on a recording medium or a case where a medium is processed regardless of whether the recording is significant or insignificant, and it does not matter whether the recording is actualized so as to be visually perceived by a human or not. In the present embodiment, a "recording medium" is assumed to be a sheet of paper, but may be, for example, a cloth or a plastic film.

Figure 1:
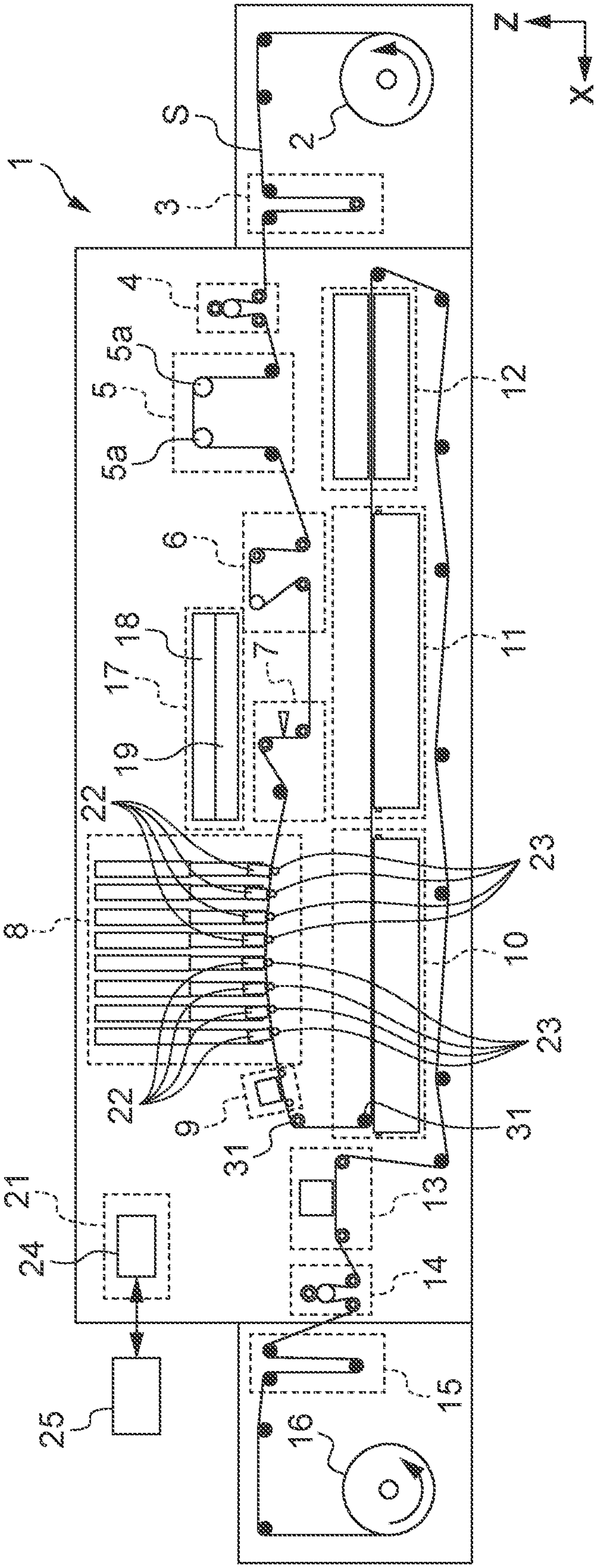
FIG. 1 is a schematic view of the internal configuration of a recording apparatus according to a first embodiment.

FIG. 1 is a schematic cross-sectional view of the internal configuration of a recording apparatus 1 as a liquid ejection apparatus according to the first embodiment of the present invention. In the present embodiment, an x direction indicates the width direction of the recording apparatus 1, a y direction indicates the rear direction of the recording apparatus 1, and a z direction indicates the height direction of the recording apparatus 1.

The recording apparatus 1 includes a sheet feeding unit 2, a first dancer unit 3, a first conveying unit 4, a skew correcting unit 5, a detecting unit 6, a mark sensor unit 7, and a recording unit 8. The recording apparatus 1 further includes a first scanner unit 9, a first drying unit 10, a second drying unit 11, a cooling unit 12, a second scanner unit 13, a second conveying unit 14, a second dancer unit 15, a winding unit 16, and a maintenance unit 17. A sheet S (e.g., a recording medium) is conveyed along a sheet conveyance path indicated by a solid line in FIG. 1, and is processed by the above-described units.

The sheet feeding unit 2 is configured to hold and store a continuous sheet wound in a roll shape and to draw out and feed the sheet S. The number of storable rolls is not limited to one. For example, two or three or more rolls may be stored. The sheet S may be selectively pulled out and supplied from one of the plurality of stored rolls.

The first dancer unit 3 is a unit for applying a constant tension to the sheet S between the sheet feeding unit 2 and the first conveying unit 4. A sheet tension is applied to the first dancer unit 3 by a tension applying unit (not illustrated).

The first conveying unit 4 is a unit for conveying the sheet S toward the skew correcting unit 5, the detecting unit 6, the mark sensor unit 7, the recording unit 8, the first scanner unit 9, the first drying unit 10, the second drying unit 11, the cooling unit 12, and the second scanner unit 13, all of which are arranged in this order along the sheet conveyance path. The first conveying unit 4 also serves as a unit for applying tension to the sheet S between the first conveying unit 4 and the second conveying unit 14. The first conveying unit 4 is rotated by driving a motor (not illustrated), and performs tension conveyance of the sheet S together with the second conveying unit 14.

The skew correcting unit 5 is a unit for correcting a skew of the sheet S in the conveyance of the sheet S. The skew correcting unit 5 includes a skew correcting roller 5*a* and a skew detecting sensor (not illustrated) for detecting a skew of the sheet S. The skew correcting roller 5*a* can change an inclination of the sheet S by a motor (not illustrated), and corrects a skew of the sheet S based on a detection result of the skew detecting sensor. At this time, winding the sheet S around the skew correcting roller 5*a* heightens the effect of skew correction.

The detecting unit 6 is a unit for detecting a tension applied to the sheet S when the sheet S is tension-conveyed between the first conveying unit 4 and the second conveying unit 14. Further, the detecting unit 6 is a unit including a mechanism for detecting a conveyance speed of the sheet S in order to control an image forming timing (ejection timing) in the recording unit 8.

The mark sensor unit 7 is a unit for detecting marks printed on the sheet S in advance in order to control the image forming timing of the recording unit 8.

The recording unit 8 is a sheet processing unit for performing a recording process by forming an image as an example by ink as a recording liquid being ejected by at least one recording head 22, or ejection head, (e.g., a plurality of recording heads 22) from above onto the sheet S being conveyed.

The sheet conveyance path in the recording unit 8 is formed by a plurality of guide rollers 23 arranged in an arc shape which is convex upward (i.e., a straight line drawn between two points of the arc shape is always below the arc shape). A constant tension applied to the sheet S by the first conveying unit 4 and the second conveying unit 14 forms a clearance (e.g., interval) of a predetermined distance between the recording heads 22 and the sheet S.

The recording apparatus 1 is an inkjet recording apparatus in which the plurality of recording heads 22 are arranged in the x direction. In the present embodiment, in addition to the recording heads 22 for four colors, black (Bk), yellow (Y), magenta (M), and cyan©, a total of eight recording heads 22 including the recording heads 22 for a reaction liquid and three special colors are provided so that one recording head is assigned to each color of ink, and the other recording head to the reaction liquid. Further, the recording heads 22 are each a full-line recording head in which nozzles (e.g., ejection ports) are arrayed over a length corresponding to the width direction of the sheet S. The number of ink colors and a reaction liquid and the number of recording heads 22 are not limited to eight. The ink of each color is supplied to the corresponding recording head 22 from its ink tank serving as a liquid container (not illustrated) through a supply path of, for example, a tube.

An ejecting element is disposed in each nozzle of the recording heads 22. An ejecting element is, for example, an element which ejects ink in its nozzle by pressure generated in its nozzle, and can use a technique for an inkjet recording head of known inkjet printers. Examples of the ejecting element include an element that ejects ink by film boiling the ink with an electrothermal transducer to create a bubble, an element that ejects ink by an electromechanical transducer, an element that ejects ink using static electricity, and a micro-electro-mechanical systems (MEMS) element. From the viewpoint of high-speed and high-density recording, an ejecting element using an electrothermal transducer can be used.

The first scanner unit 9 is a unit for reading an image formed on the sheet S by the recording unit 8, detecting the deviation and the density of the image, and correcting the recording process by the recording unit 8. After passing through the first scanner unit 9, the sheet S is conveyed in the sheet conveyance direction, which is reversed by a guide roller 31.

The first drying unit 10 and the second drying unit 11 are units that reduce the moisture contained in the ink applied onto the sheet S by the recording unit 8 and increase the fixability of the ink to the sheet S. The second drying unit 11 is disposed downstream of the first drying unit 10 in the sheet conveyance direction. The first drying unit 10 and the second drying unit 11 dry the ink applied to the sheet S by applying hot air to at least the ink applied surface (e.g., recording surface) of the passing sheet S. As the drying method, in addition to the method of applying hot air, a method of irradiating the surface of the sheet S with electromagnetic waves (such as ultraviolet rays or infrared rays), a method of conduction heat transfer performed by contact with a heating element, or a combination of a plurality of these methods may be adopted.

The guide roller 31 is a roller that winds the back surface of the recording surface of the sheet S at a constant winding angle in order to prevent the hot air in the first drying unit 10 from affecting the recording process in the recording unit

8. Two guide rollers 31 according to the present embodiment are disposed between the first scanner unit 9 and the first drying unit 10. Thus, the sheet S is turned around in the vertical direction of the recording apparatus 1 and is conveyed such that the sheet conveyance direction is reversed. In the present embodiment, the first drying unit 10 is disposed under the recording unit 8, and the second drying unit 11 is disposed under the detecting unit 6 and the mark sensor unit 7.

The cooling unit 12 cools the sheet S on which the ink is fixed by the first drying unit 10 and the second drying unit 11. The cooling unit 12 solidifies the softened ink and reduces a change in temperature of the sheet S in the downstream process of the recording apparatus 1. Inside the cooling unit 12, air (cold air) having a temperature lower than that of the sheet S passing through the cooling unit 12 is applied to at least the recording surface of the passing sheet S to cool the recording surface of the sheet S. The cooling method is not limited to the method of applying air, and a method of conduction heat transfer performed by contact with a heat dissipation member may be adopted, or a plurality of these methods may be combined.

The second scanner unit 13 is a unit for reading a test image formed on the sheet S by the recording unit 8, detecting the deviation and/or the density of the image, and for example, correcting an ejection timing based on the detection result, before a recording operation is performed by receiving a recording instruction from a user.

The second conveying unit 14 is a unit for conveying the sheet S with a tension applied to the sheet S between the first conveying unit 4 and the second conveying unit 14, and adjusting the tension to the sheet S. The second conveying unit 14 is rotated by being driven by a motor (not illustrated), and adjusts the tension to the sheet S by a drive-coupled clutch (not illustrated) controlling torque based on a tension value detected by the detecting unit 6.

As a configuration for adjusting the tension to the sheet S, a configuration for controlling the speed of the second conveying unit 14 by the detecting unit 6 may be added. In this case, the recording apparatus 1 employ two methods as the tension control method: a torque control method for controlling a torque value transmitted from the clutch and a speed control method for controlling the roller speed of the second conveying unit 14. These two methods can be switched as the tension control method suited to a purpose, or both methods can be used at the same time.

The second dancer unit 15 is a unit for applying a constant sheet tension between the second conveying unit 14 and the winding unit 16. A sheet tension is applied to the second dancer unit 15 by a tension applying unit (not illustrated).

The winding unit 16 is a unit for winding the sheet S through the recording process on its winding core. The number of rollers that can take up the sheet S is not limited to one, and a configuration may be employed in which the sheet S is taken up on one of two or three or more winding cores switched selectively. Further, instead of a configuration of winding the sheet S on a winding core, a configuration may be employed in which the continuous sheet is cut using a cutter and the cut sheet S is discharged and stacked, based on a process after recording. Furthermore, the present invention can also be applied to a configuration in which recording is performed by feeding a sheet-shaped recording medium cut in advance, instead of the roll-shaped sheet S.

Figure 11:
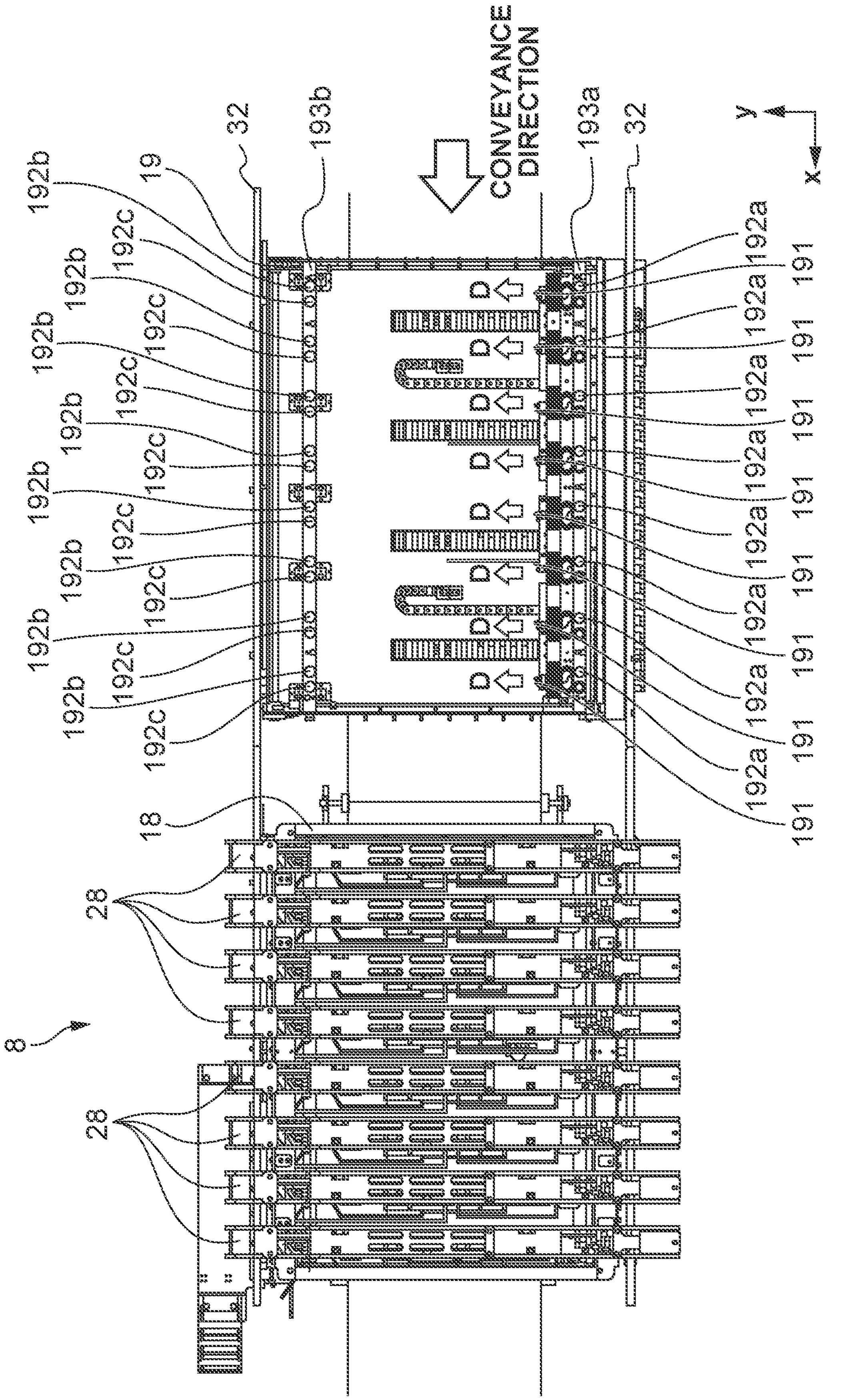
FIG. 11 is a top view of the configuration of the recording unit and the maintenance unit according to the first embodiment.
Figure 13:
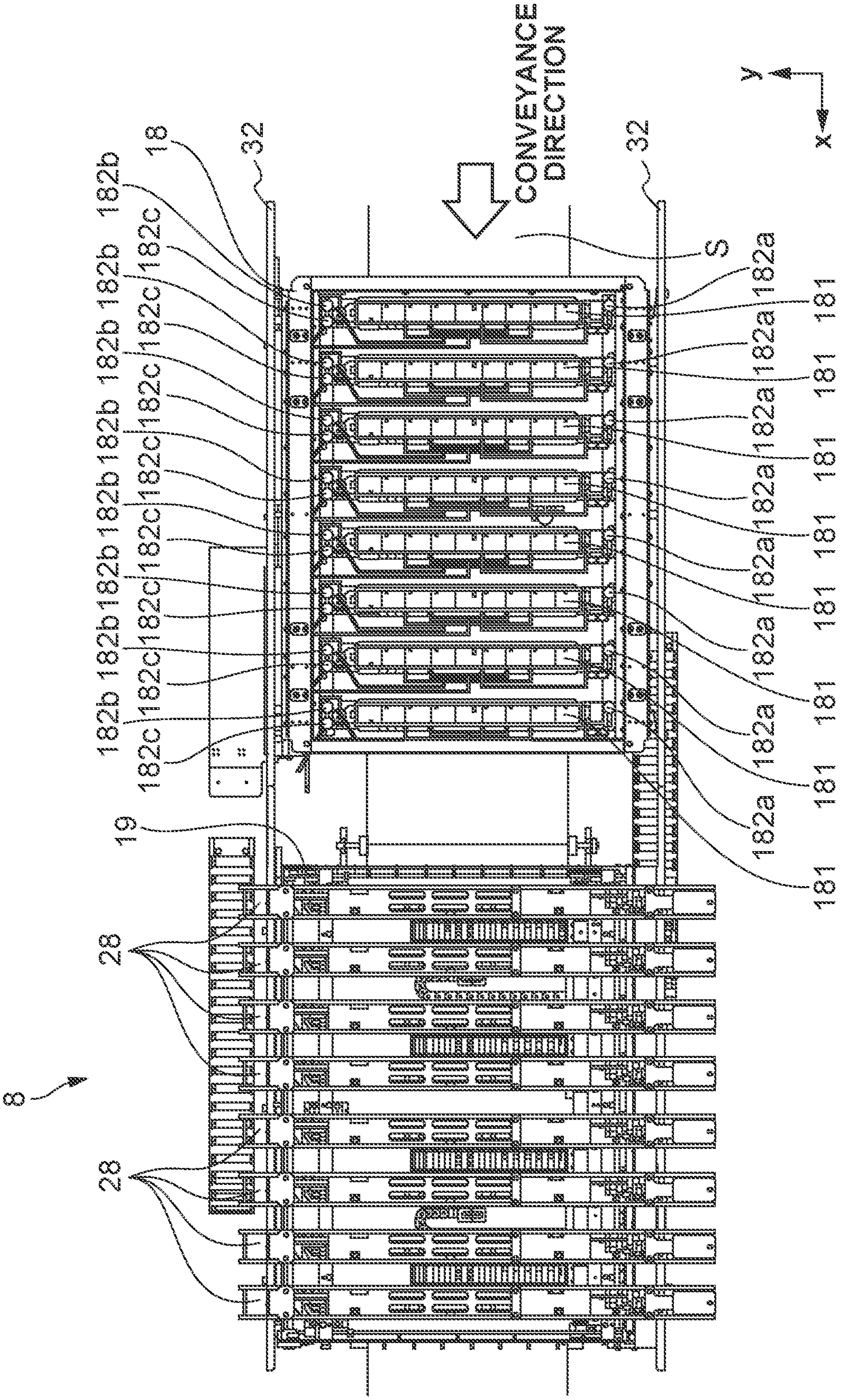
FIG. 13 is a top view of the configuration of the recording unit and the maintenance unit according to the first embodiment.

The maintenance unit 17 is a unit including a cap tray 18 on which cap mechanisms 181 for protecting the ink ejection surfaces of the recording heads 22 are disposed (as shown, for example, in FIG. 13, and a cleaning tray 19 on which cleaning mechanisms 191 for recovering the ejection capability of the recording heads 22 are disposed (as shown, for example, in FIG. 11). The ink ejection surfaces are ejection port surfaces (e.g., nozzle surfaces) on which a plurality of ejection ports for discharging ink are arranged in the recording heads 22. The maintenance unit 17 will be described in detail below.

A control unit 21 is a unit for controlling the units of the entire recording apparatus 1. The control unit 21 includes a controller including a CPU, a storage device, and various types of control unit, an external interface, and an operation unit 24 through which a user performs input and output operations. The operation of the recording apparatus 1 is controlled based on commands from the controller or a host apparatus 25 of, for example, a host computer connected to the controller via the external interface.

Figure 2:
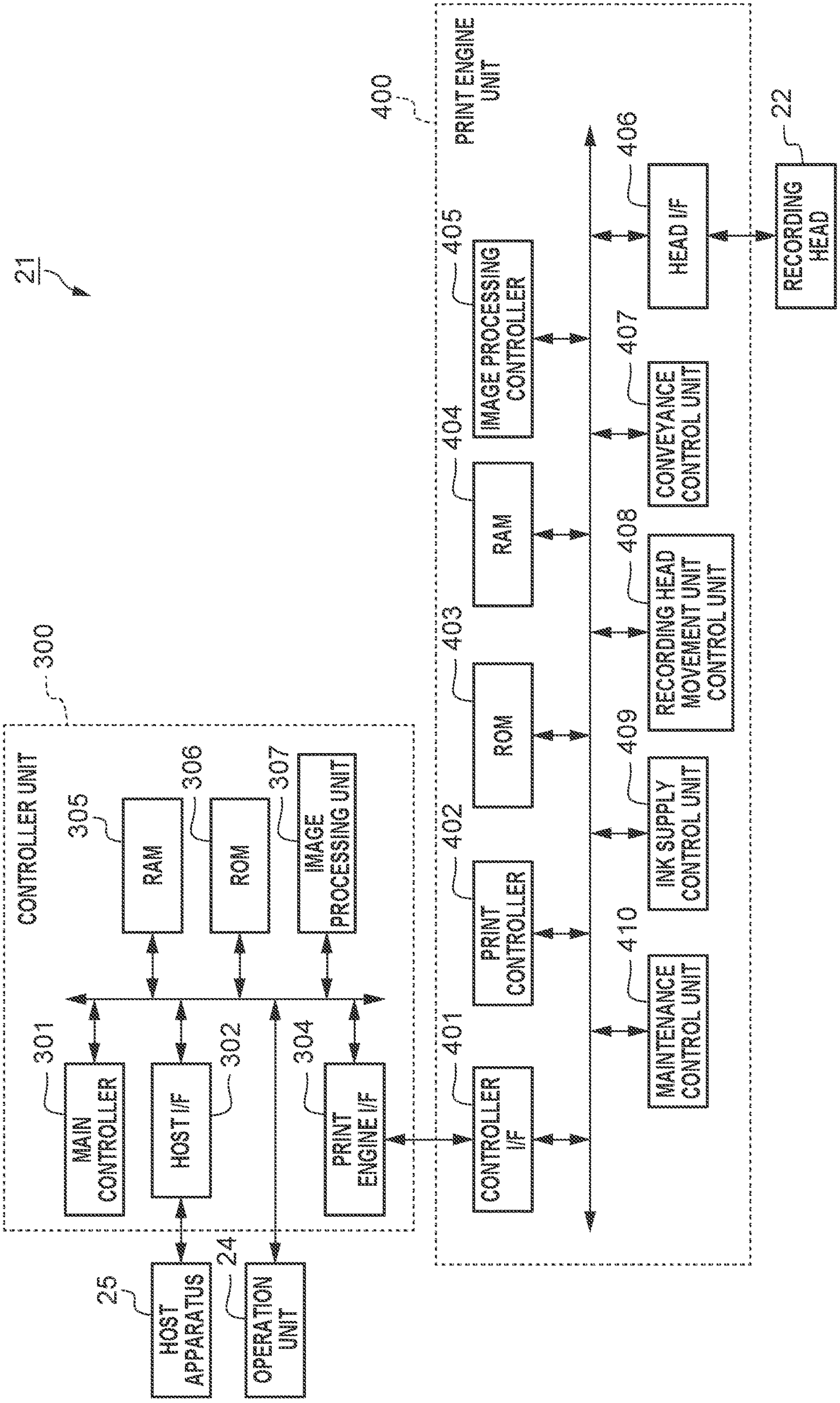
FIG. 2 is a control configuration diagram of the recording apparatus according to the first embodiment.

FIG. 2 is a block diagram illustrating a control configuration in the recording apparatus 1. The control configuration of the control unit 21 includes a print engine unit 400 for controlling the recording apparatus 1 and a controller unit 300 for controlling the entire recording apparatus 1. A print controller 402 controls various types of mechanism of the print engine unit 400 based on instructions from a main controller 301 of the controller unit 300. The control configuration will be described in detail.

In the controller unit 300, the main controller 301 provided with a central processing unit (CPU) controls the entire recording apparatus 1 using a random access memory (RAM) 305 as a work area, based on programs and various types of parameter stored in a read-only memory (ROM) 306. For example, when a print job is input from the host apparatus 25 via a host interface (I/F) 302, an image processing unit 307 performs predetermined image processing on received image data based on instructions from the main controller 301. The main controller 301 transmits the image data that has gone through the image processing to the print engine unit 400 via a print engine OF 304.

The recording apparatus 1 may acquire image data from the host apparatus 25 via wireless communication or wired communication, or may acquire image data from an external storage device (for example, a universal serial bus (USB) memory) connected to the recording apparatus 1. A communication method used for wireless communication or wired communication is not limited. For example, Wireless Fidelity (Wi-Fi®) or Bluetooth® can be applied as a communication method used for wireless communication. In addition, for example, a USB is applicable as a communication method used for wired communication.

The operation unit 24 is a mechanism for a user to input and output data to and from the recording apparatus 1. The user can set print modes and recognize information on the recording apparatus 1 via the operation unit 24.

In the print engine unit 400, the print controller 402 provided with a CPU controls various types of mechanism of the recording apparatus 1 using a RAM 404 as a work area based on programs and various type of parameter stored in a ROM 403. When various types of command or image data are received via a controller I/F 401, the print controller 402 temporarily stores the commands or the image data in the RAM 404.

The print controller 402 causes an image processing controller 405 to convert the stored image data into print data so that the recording heads 22 can use the print data for recording operation. When the print data is generated, the print controller 402 causes the recording heads 22 to perform recording operation based on the print data via a head IF 406.

In the mean time, the print controller 402 conveys the sheet S by driving the various types of unit illustrated in FIG. 1 via a conveyance control unit 407. In other words, the print controller 402 drives the sheet feeding unit 2, the first dancer unit 3, the first conveying unit 4, the skew correcting unit 5, the detecting unit 6, the mark sensor unit 7, and the recording unit 8. The print controller 402 also drives the first scanner unit 9, the first drying unit 10, the second drying unit 11, the cooling unit 12, the second scanner unit 13, the second conveying unit 14, the second dancer unit 15, and the winding unit 16. Based on instructions from the print controller 402, the recording operation by the recording heads 22 is performed in conjunction with the conveyance operation of the sheet S, which performs a recording process on the sheet S.

A recording head movement unit control unit 408 changes the position of the recording heads 22 depending on an operation state, such as a maintenance state and a recording state of the recording apparatus 1. An ink supply control unit 409 controls an ink supply unit (not illustrated) so that the pressure of the ink supplied to the recording heads 22 falls within an appropriate range. A maintenance control unit 410 controls the operation of the maintenance unit 17 when performing a maintenance operation on the recording heads 22.

Figure 3:
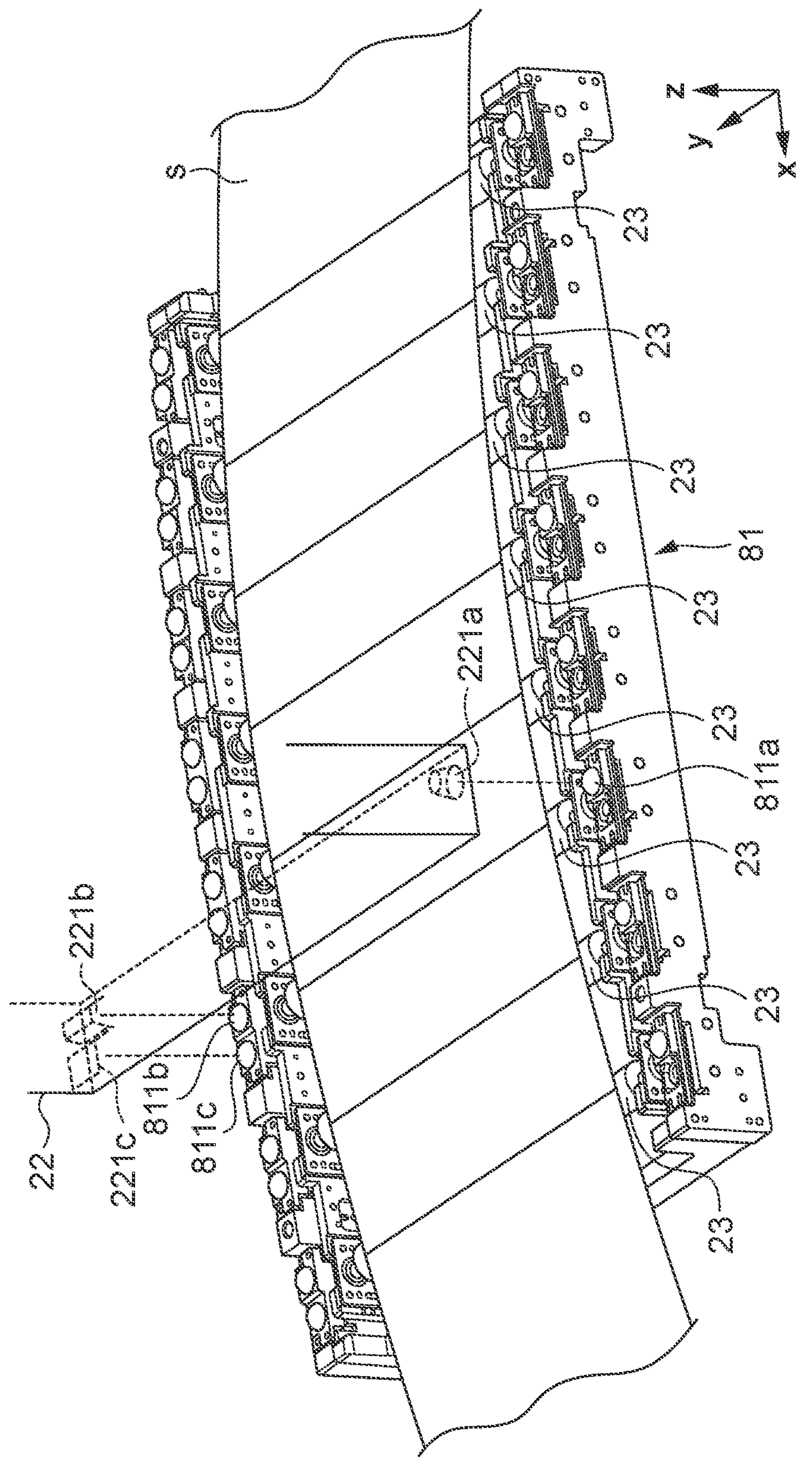
FIG. 3 is a perspective view of a conveyance unit housing of a recording unit according to the first embodiment.

FIG. 3 is a perspective view of a conveyance unit housing 81 of the recording unit 8. As illustrated in FIG. 3, a first positioning portion 811*a*, a second positioning portion 811*b*, and a third positioning portion 811*c* for positioning a recording head 22 at the printing position (e.g., recording position) are disposed for each recording head 22 in the conveyance unit housing 81 of the recording unit 8. For one recording head 22, the first positioning portion 811*a* is disposed nearer the front side (e.g., apparatus front side) than the rear side in the sheet width direction (y direction) orthogonal to the sheet conveyance direction, and the second positioning portion 811*b* and the third positioning portion 811*c* are disposed nearer the rear side (e.g., apparatus rear side) than the front side. The first positioning portion 811*a*, the second positioning portion 811*b*, and the third positioning portion 811*c* are collectively referred to as recording head positioning portions 811.

Figure 4:
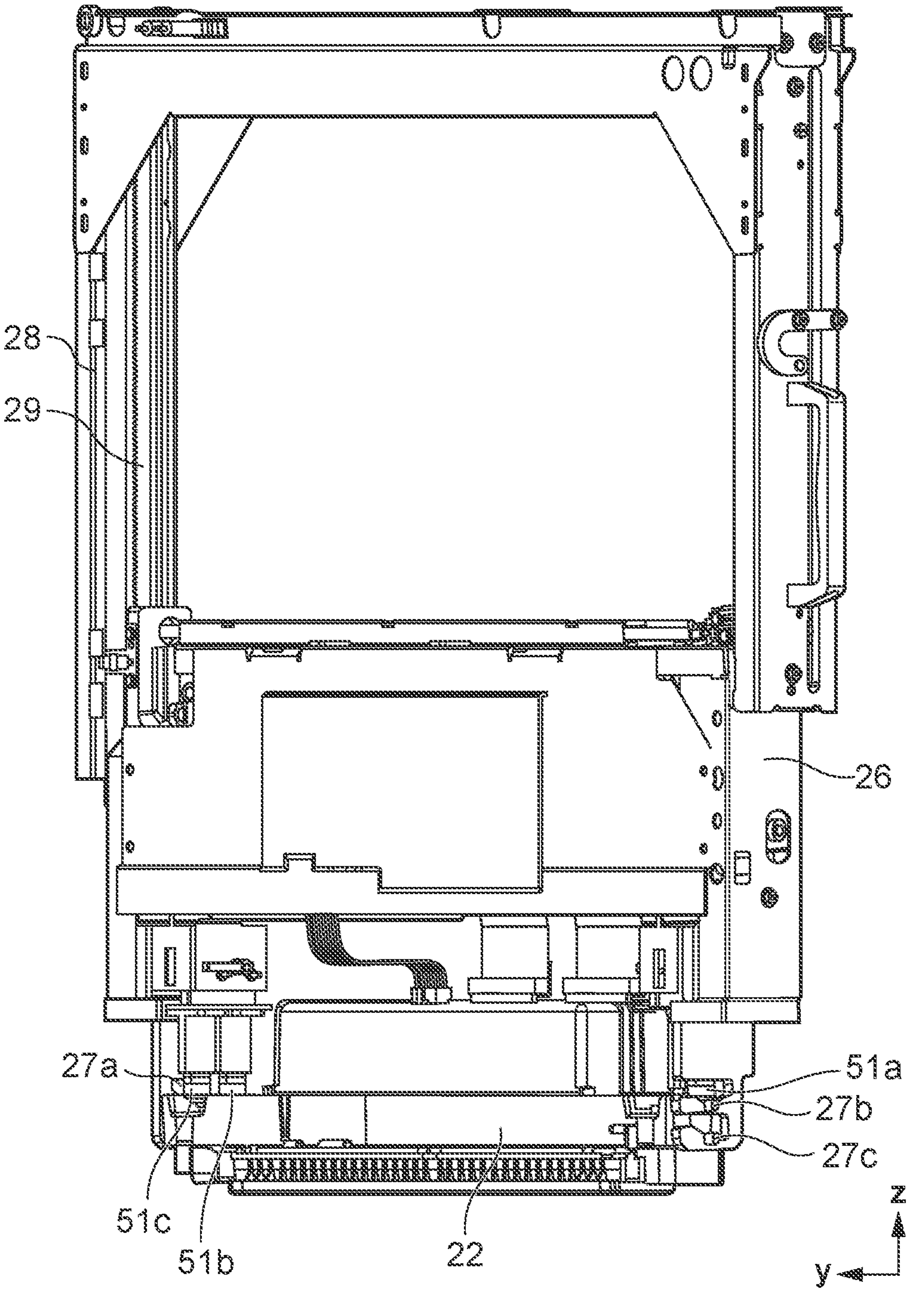
FIG. 4 is a perspective view of a vertical movement mechanism of a recording head according to the first embodiment.

As illustrated in FIG. 4, each of the recording heads 22 is supported by a head holder 26 as a support part, and is configured to move vertically (z direction) by movement of the head holder 26. In the recording head 22, a first pin 27*a*, a second pin 27*b*, and a third pin 27*c* as supported parts supported by the head holder 26 are arranged.

The first pin 27*a* is a protruding portion that protrudes in the y direction from its end portion facing the apparatus front side in the longitudinal direction (y direction) of the recording head 22 that intersects the vertical movement direction of the recording head 22 and the sheet conveyance direction. The second pin 27*b* and the third pin 27*c* are each a protruding portion that protrudes in the y direction from its end portion facing the apparatus rear side in the longitudinal direction of the recording head 22. The first pin 27*a*, the second pin 27*b*, and the third pin 27*c* are respectively supported from below by a first hole, a second hole, and a third hole (not illustrated), which are arranged in the head holder 26, and thus the recording head 22 is axially supported with respect to the head holder 26.

Further, the recording head 22 is supported by the head holder 26 while being urged downward by urging members 51 (e.g., a first urging member 51*a*, a second urging member 51*b*, and a third urging member 51*c*) including compression springs disposed in the head holder 26. The head holder 26 is moved vertically along a rail 29 for vertical movement in a frame 28 by a driving mechanism (not illustrated) in the head holder 26. In short, the rail 29 and the not-illustrated driving mechanism function as a head vertical movement mechanism.

<Positioning of Recording Head>

Figure 5:
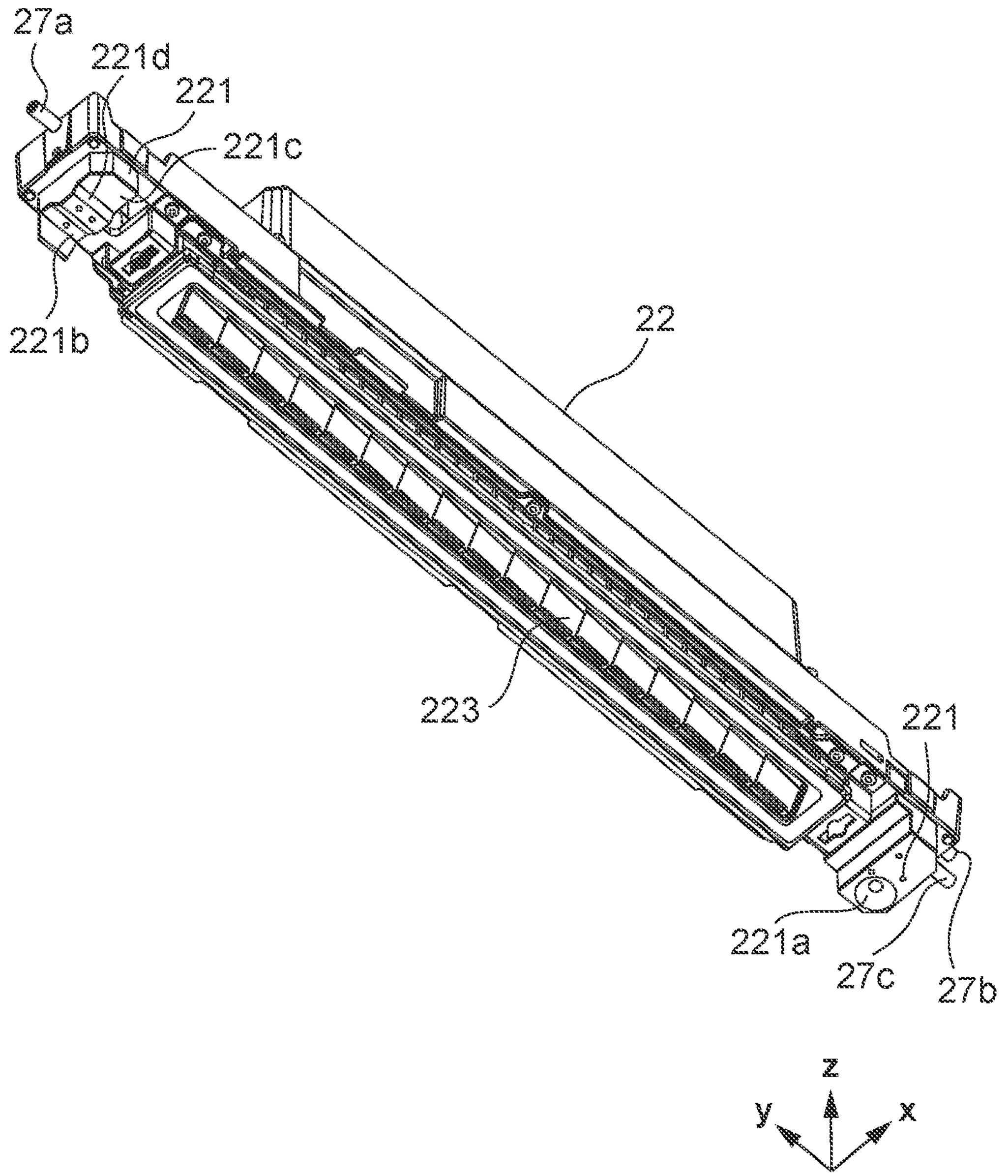
FIG. 5 is a perspective view of the recording head according to the first embodiment.

FIG. 5 is a perspective view of each recording head 22. As illustrated in FIG. 5, in the recording head 22, a plurality of nozzle plates 223 provided with a plurality of nozzles for ejecting ink are arranged in the longitudinal direction (sheet width direction, or y direction), and contact portions 221 for positioning the recording head 22 are provided at both ends of the recording head 22 in the longitudinal direction.

Considering the contact portions 221 in detail, a first contact portion 221*a* formed of a concave portion having a conical inclined surface is provided nearer the front side (e.g., apparatus front side) of the recording head 22 in the y direction than the rear side. In addition, a second contact portion 221*b* formed of a groove portion having two V-shaped flat surfaces and a third contact portion 221*c* formed of a flat surface portion are provided nearer the rear side (e.g., apparatus rear side) of the recording head 22 in the y direction than the front side. In this embodiment, the first contact portion 221*a*, the second contact portion 221*b*, and the third contact portion 221*c* are collectively referred to as the contact portions 221.

A guide portion 221*d* is disposed adjacent to the third contact portion 221*c*. The guide portion 221*d* prevents the third positioning portion 811*c* (refer to FIG. 7) from being displaced due to a slide of the recording head 22 that occurs when the third contact portion 221*c* and the third positioning portion 811*c* of the conveyance unit housing 81 come into contact with each other.

The contact portions 221 are disposed such that a straight line connecting the centers of the first contact portion 221*a* and the second contact portion 221*b* and extending in the y direction is parallel to the arrangement of the plurality of nozzle plates 223 of the recording head 22. The third contact portion 221*c* is disposed at a position away from the second contact portion 221*b* in a direction (z direction) orthogonal to the y direction.

Figure 6:
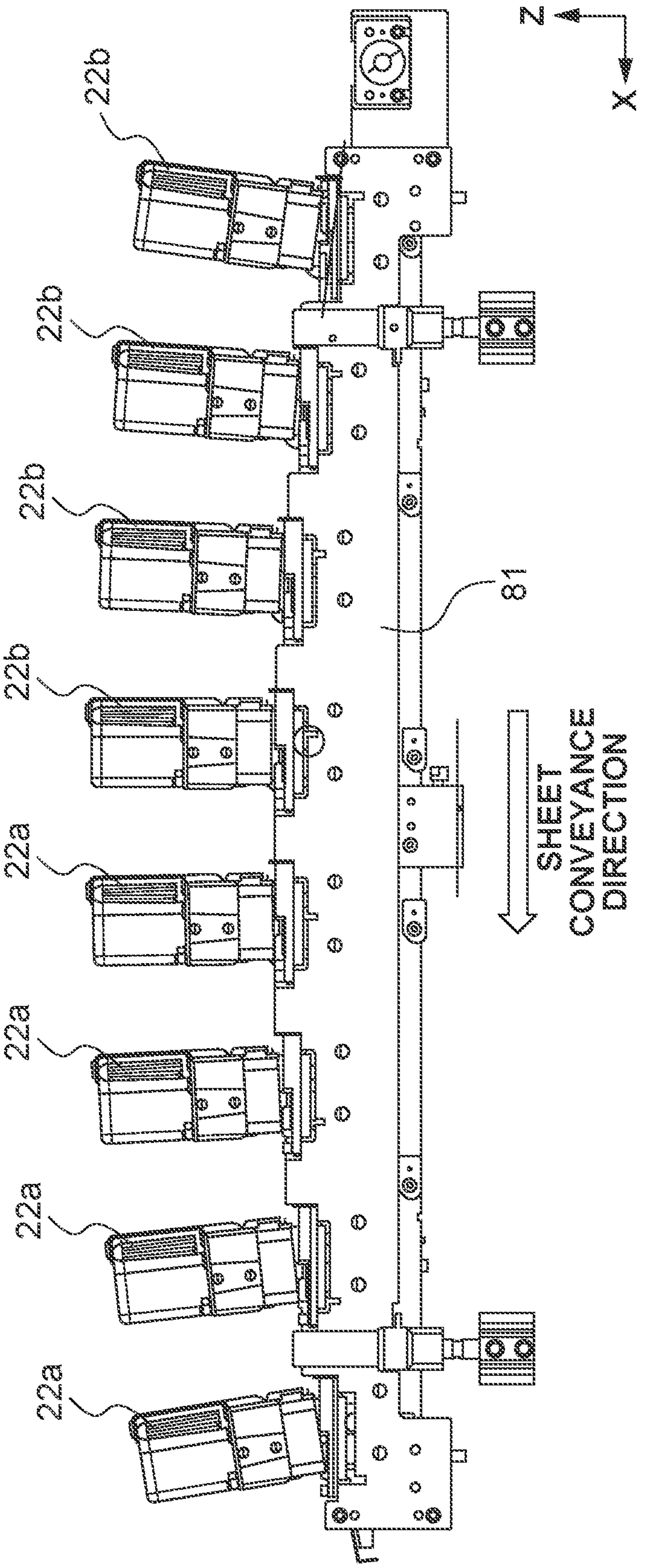
FIG. 6 is a front view of the periphery of the recording head according to the first embodiment.

FIG. 6 illustrates the plurality of recording heads 22 each positioned in contact with the corresponding recording head positioning portions 811 (refer to FIG. 7) provided on the conveyance unit housing 81, as viewed from the apparatus front side. In the present embodiment, the ink ejection surfaces of the plurality of recording heads 22 are positioned along the arc-shaped sheet conveyance path, inclined at different angles with respect to the horizontal direction (xy direction). The ink ejection surfaces of the plurality of recording heads 22 are classified into a first recording head 22*a* arranged to be downwardly inclined downstream in the sheet conveyance direction (x direction) in FIG. 6, and a second recording head 22*b* arranged to be downwardly inclined upstream in the x direction. The present invention is not limited to a configuration in which the ink ejection surfaces of the recording heads 22 are inclined at angles with respect to the horizontal direction (xy direction). A configuration can also be employed in which the ink ejection surfaces are parallel to the horizontal direction.

Figure 7A:
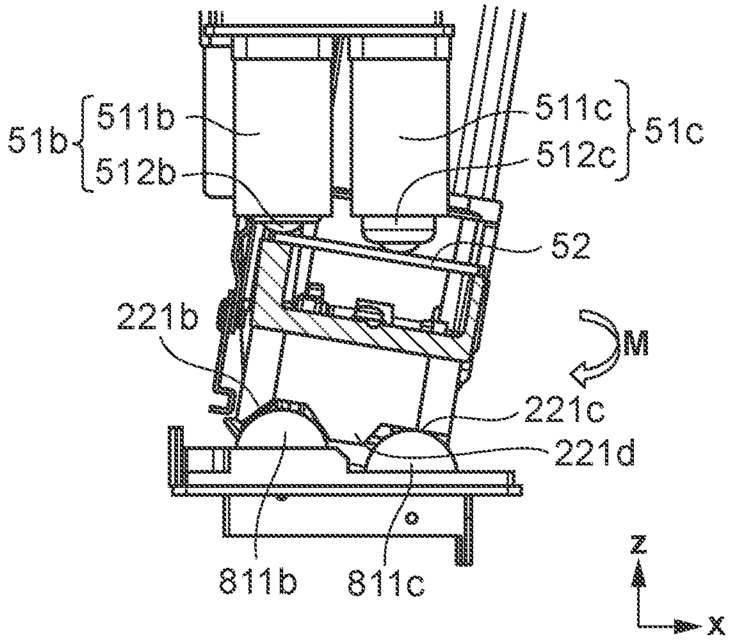
FIGS. 7A and 7B illustrate a detailed configuration of both end portions of the recording head according to the first embodiment.
Figure 7B:
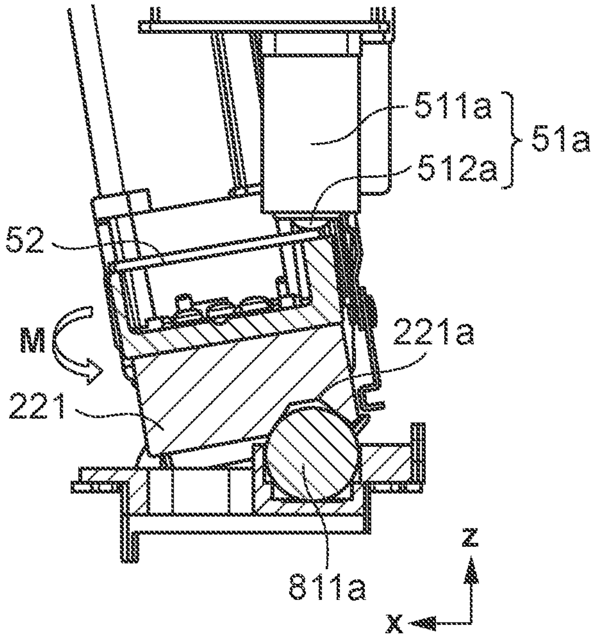

FIGS. 7A and 7A illustrate detailed configurations of both end portions of each recording head 22 in the longitudinal direction (y direction). FIG. 7A illustrates one recording head 22 as viewed from the rear side in the y direction (the apparatus rear side), and FIG. 7B illustrates the recording head 22 as viewed from the front side in the y direction (e.g., the apparatus front side). The first urging member 51*a* is disposed above the first contact portion 221*a*, facing the first contact portion 221*a* of the recording head 22. The second urging member 51*b* is disposed above the second contact portion 221*b*, facing the second contact portion 221*b* of the recording head 22. The third urging member 51*c* is disposed above the third contact portion 221*c*, facing the third contact portion 221*c* of the recording head 22. The first urging member 51*a*, the second urging member 51*b*, and the third urging member 51*c* are collectively referred to as the urging members 51.

With the recording head 22 positioned in the conveyance unit housing 81, the first contact portion 221*a* is in contact with the first positioning portion 811*a*. The second contact portion 221*b* is in contact with the second positioning portion 811*b*, and the third contact portion 221*c* is in contact with the third positioning portion 811*c*.

The first urging member 51*a* includes a first base portion 511*a*, a first sliding portion 512*a*, and a spring (not illustrated), and the first sliding portion 512*a* is configured to be slidable with respect to the first base portion 511*a*. Similarly, the second urging member 51*b* includes a second base portion 511*b*, a second sliding portion 512*b*, and a spring (not illustrated), and the second sliding portion 512*b* is configured to be slidable with respect to the second base portion 511*b*. The third urging member 51*c* includes a third base portion 511*c*, a third sliding portion 512*c*, and a spring (not illustrated), and the third sliding portion 512*c* is configured to be slidable with respect to the third base portion 511*c*.

Each recording head 22 includes plates 52 arranged at both ends of the recording head 22 in the longitudinal direction (y direction) such that the plates 52 are in contact with the first sliding portion 512*a*, the second sliding portion 512*b*, and the third sliding portion 512*c*. The first sliding portion 512*a*, the second sliding portion 512*b*, and the third sliding portion 512*c* each have a spherical portion to come into contact with the corresponding plate 52, the spherical portion of which is configured to be slidable with respect to the plate 52. At each urging position of the urging members 51*a*, 51*b* with the recording head 22 in contact with the head holder 26, a moment M as illustrated in FIG. 7A, 7B is applied around the recording head positioning portion 811 so that the contact portion 221 reliably lands on the recording head positioning portion 811.

<Configuration of Maintenance Unit>

A configuration of the maintenance unit 17 of the recording apparatus 1 will now be described with reference to FIGS. 8 to 13.

Figure 8:
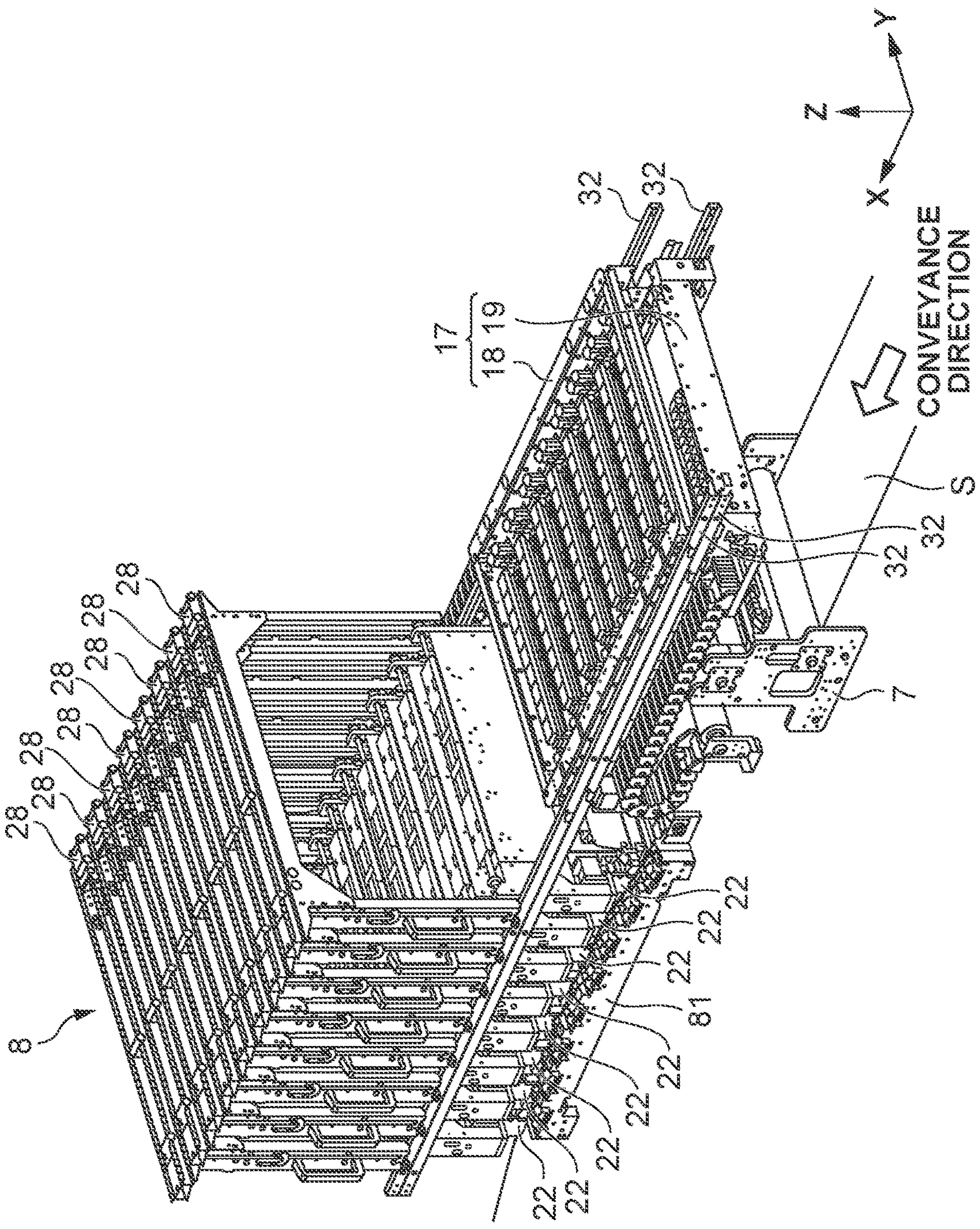
FIG. 8 is a perspective view of a configuration of the recording unit and a maintenance unit according to the first embodiment.
Figure 9:
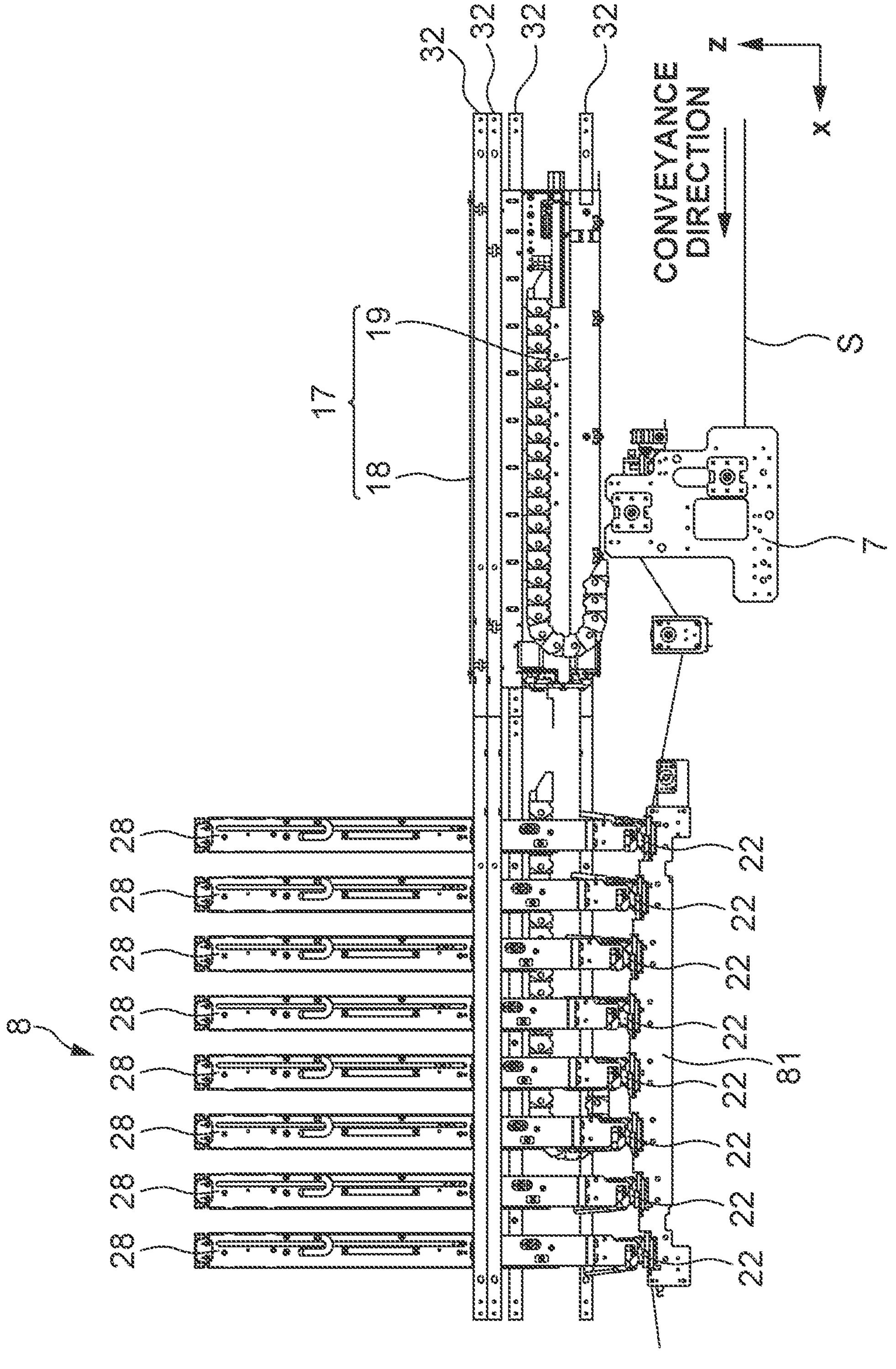
FIG. 9 is a front view of the configuration of the recording unit and the maintenance unit according to the first embodiment.
Figure 10:
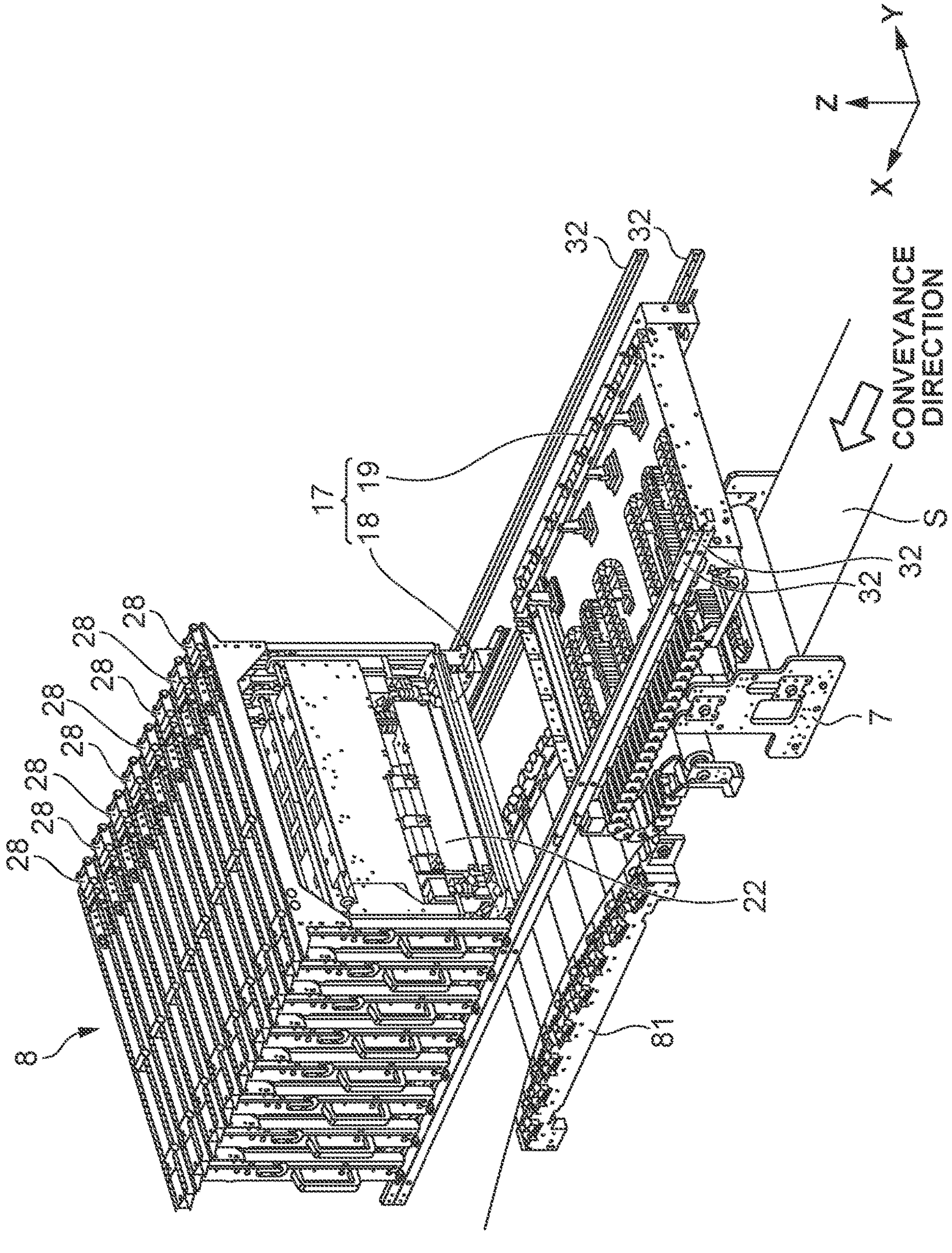
FIG. 10 is a perspective view of the configuration of the recording unit and the maintenance unit according to the first embodiment.
Figure 12:
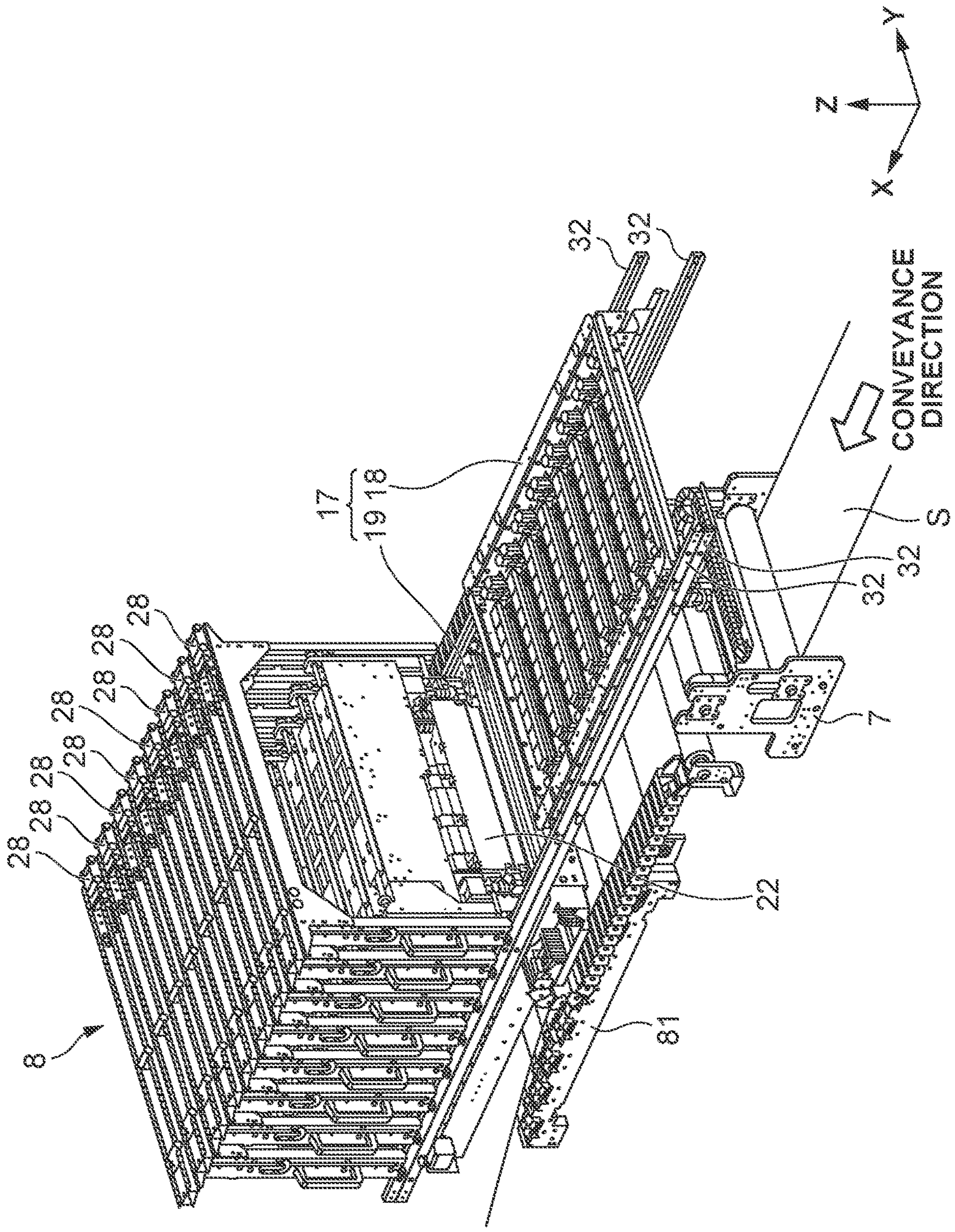
FIG. 12 is a perspective view of the configuration of the recording unit and the maintenance unit according to the first embodiment.

FIG. 8 is a perspective view of a configuration of the recording unit 8 and the maintenance unit 17 in a recording state in which recording is performed by the recording heads 22, and FIG. 9 illustrates the configuration of FIG. 8 as viewed from the front side of the recording apparatus 1. FIG. 10 is a perspective view of a capping state in which the ink ejection surfaces of the recording heads 22 are protected by capping mechanisms to be described below, and FIG. 11 illustrates the configuration of FIG. 10 as viewed from the top side of the recording apparatus 1. FIG. 12 is a perspective view of a state during a cleaning operation for recovering ejection performance by the cleaning mechanisms to be described below, and FIG. 13 illustrates the configuration of FIG. 12 as viewed from the top side of the recording apparatus 1.

As illustrated in FIGS. 8 to 11, the maintenance unit 17 includes the cap tray 18 on which the cap mechanisms 181 (refer to FIG. 13) are disposed and the cleaning tray 19 on which the cleaning mechanisms 191 (refer to FIG. 11) are disposed. The cap tray 18 and the cleaning tray 19 are configured to be individually movable in the width direction (x direction) of the recording apparatus 1 by a driving motor (not illustrated) along a plurality of rails 32 arranged on the housing of the recording apparatus 1. The rails 32 are each a guide mechanism that guides movement of the cap tray 18 and the cleaning tray 19 in the x direction with the end portions of the cap tray 18 and the cleaning tray 19 supported in the sheet width direction (y direction).

FIGS. 8 and 9 illustrate a recording state in which recording is performed on the sheet S by the recording heads 22, and the cap tray 18 and the cleaning tray 19 are positioned upstream of the recording unit 8 in the sheet conveyance direction. In the recording state, the cap tray 18 is positioned directly above the cleaning tray 19. The positions of the cap tray 18 and the cleaning tray 19 in the recording state are also referred to as standby positions.

FIGS. 10 and 11 illustrate a capping state in which the ink ejection surfaces of the recording heads 22 are capped by the cap mechanisms 181. In the capping state, the cap tray 18 is positioned directly below the recording heads 22 of the recording unit 8, and the cleaning tray 19 is positioned upstream of the recording unit 8 in the sheet conveyance direction. In other words, the cap tray 18 is moved along the rails 32 from its standby position to the capping position downstream in the sheet conveyance direction, and the cleaning tray 19 is positioned at its standby position.

FIGS. 12 and 13 illustrate a cleaning state in which the ink ejection surfaces of the recording heads 22 are cleaned by cleaning mechanisms 191. In the cleaning state, the cleaning tray 19 is positioned directly below the recording heads 22 of the recording unit 8, and the cap tray 18 is positioned upstream of the recording unit 8 in the sheet conveyance direction. In other words, the cleaning tray 19 is moved along the rails 32 from its standby position to a cleaning position downstream in the sheet conveyance direction, and the cap tray 18 is positioned at its standby position.

As illustrated in FIG. 13, the cap mechanisms 181 in the cap tray 18 each include a plurality of spherical recording head positioning portions 182 for positioning the recording head 22 with respect to the cap mechanism 181. The recording head positioning portions 182 are arranged at both ends of each cap mechanism 181 in the sheet width direction (y direction).

A first recording head positioning portion 182*a* is arranged upstream (e.g., on the apparatus front side) in the y direction, and a second recording head positioning portion 182*b* and a third recording head positioning portion 182*c* are arranged downstream (e.g., on the apparatus rear side) in the y direction. The first recording head positioning portion 182*a*, the second recording head positioning portion 182*b*, and the third recording head positioning portion 182*c* are collectively referred to as the recording head positioning portions 182.

The recording heads 22 and the cap mechanisms 181 are positioned such that the contact portions 221 disposed at both ends of the recording heads 22 in the longitudinal direction (y direction) are in contact with the recording head positioning portions 182 disposed at both ends of the cap mechanisms 181 in the y direction.

Further, as illustrated in FIG. 11, the cleaning tray 19 is provided with a plurality of spherical recording head positioning portions 192 for positioning the recording head 22 with respect to the cleaning tray 19. The recording head positioning portions 192 are held by an upstream beam member 193*a* and a downstream beam member 193*b*, both of which extend in the x direction. The upstream beam member 193*a* and the downstream beam member 193*b* are disposed apart from each other in the sheet conveyance direction (x direction).

The recording head positioning portions 192 are arranged at both ends of the cleaning tray 19 in the sheet width direction (x direction). A first recording head positioning portion 192*a* is disposed upstream (apparatus front side) in the y direction and is held by the upstream beam member 193*a*. In addition, a second recording head positioning portion 192*b* and a third recording head positioning portion 192*c* are disposed downstream (e.g., the apparatus rear side) in the y direction, and are held by the downstream beam member 193*b*. The first recording head positioning portion 192*a*, the second recording head positioning portion 192*b*, and the third recording head positioning portion 192*c* are collectively referred to as the recording head positioning portions 192.

The recording heads 22 and the cleaning tray 19 are positioned such that the contact portions 221 disposed at both ends of each of the recording heads 22 in the longitudinal direction (y direction) are in contact with corresponding recording head positioning portions 192 disposed at both ends of the cleaning tray 19 in the y direction.

The configuration for positioning with respect to the recording heads 22 is not limited to the configuration using the spherical positioning portions. For example, a configuration in which the contact of a part of the recording heads 22 is made in the cleaning tray 19, or a configuration in which the recording heads are positioned using holes and pins respectively arranged on the cleaning tray 19 and the recording heads 22 may be employed.

Figure 14:
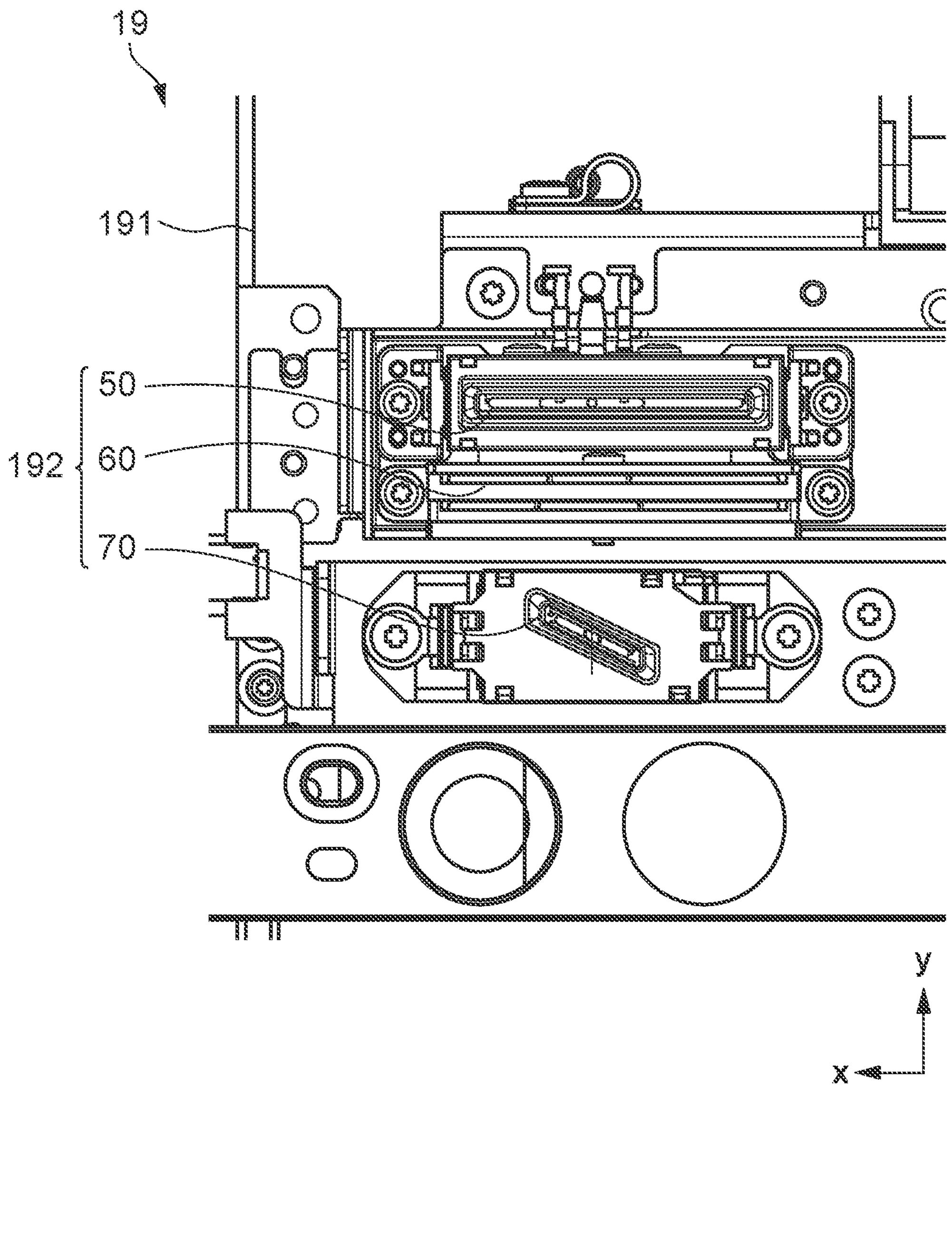
FIG. 14 is an enlarged view of the configuration of a cleaning mechanism according to the first embodiment.

FIG. 14 is an enlarged view of a detailed configuration of each of the cleaning mechanisms 191 in the cleaning tray 19. The cleaning mechanism 191 includes a cleaning liquid applying unit 50 for applying a cleaning liquid to the nozzle plates 223 of the recording head 22, and a liquid removing unit (wiper unit) 60 as a wiper for removing (wiping) ink, paper dust, and the cleaning liquid on the recording heads 22. The cleaning mechanism 191 includes a suction unit 70 for applying a negative pressure to the nozzle plates 223 of the recording head 22 to remove ink adhering to the inside of the nozzles and bubbles in the ink flow paths. The suction unit 70 is connected to suction means (negative pressure generating means) (not illustrated).

The cleaning tray 19 includes moving mechanisms (not illustrated) for moving the cleaning mechanisms 191 in the wiping direction D orthogonal to the sheet conveyance direction (refer to FIG. 11). While moving in the wiping direction D by the moving mechanisms, the cleaning mechanisms 191 remove ink and dust on the ink ejection surfaces of the recording heads 22 with the cleaning liquid applying unit 50, the liquid removing unit 60, and the suction unit 70, thereby recovering the ejection performance of the recording heads 22.

<Operation of Recording Heads>

An operation of the recording heads 22 will now be described. FIGS. 15A to 15D schematically illustrate an operation of positioning the recording heads 22 with respect to the cap tray 18. FIGS. 16A and 16B schematically illustrate an operation of positioning the recording heads 22 with respect to the cleaning tray 19.

Figure 15A:
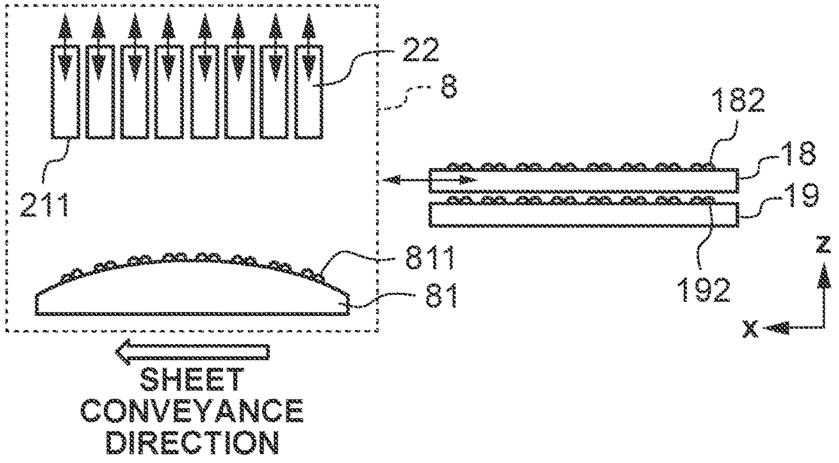
FIGS. 15A to 15D illustrate a positioning operation of the recording head according to the first embodiment.
Figure 16A:
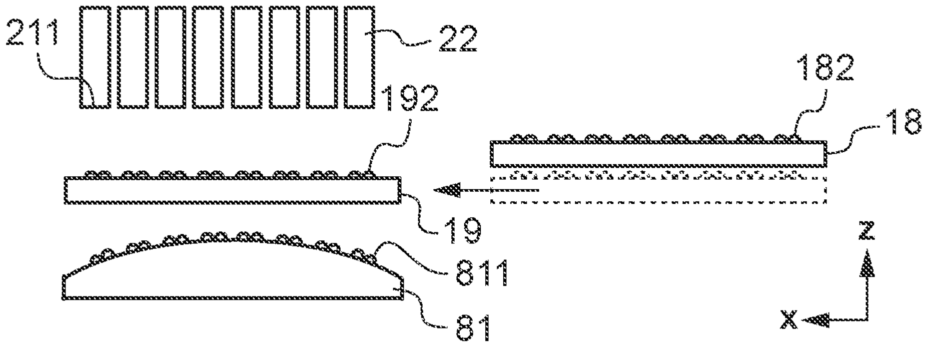
FIGS. 16A and 16B illustrate the positioning operation of the recording head according to the first embodiment.
Figure 16B:
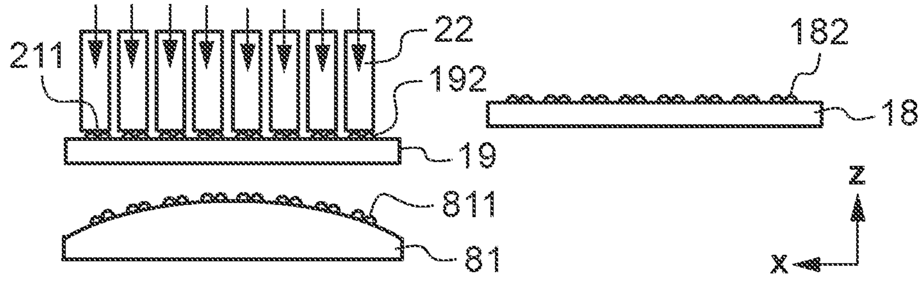

FIG. 15A illustrates a state in which the recording heads 22 are at a retracted position where the recording heads 22 are retracted upward from the conveyance unit housing 81. Further, the cap tray 18 and the cleaning tray 19 are at their standby positions, retracted upstream of the recording heads 22 in the sheet conveyance direction.

Figure 15B:
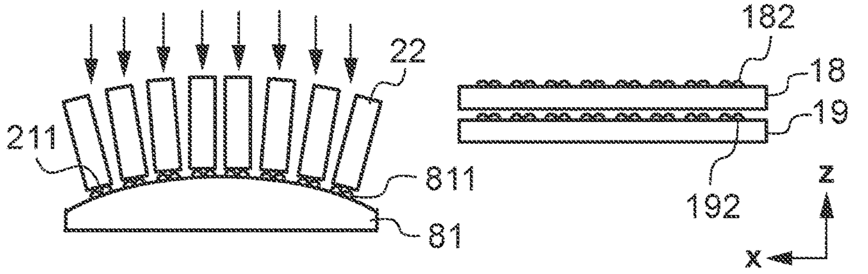

FIG. 15B illustrates a state where the recording heads 22 are at the recording position at which an image is recorded on the sheet S. The recording heads 22 are moved downward from the retracted position illustrated in FIG. 15A by the head vertical movement mechanisms. The movement of the recording heads 22 is completed when the contact portions 221 of the recording heads 22 come into contact with the recording head positioning portions 811 of the conveyance unit housing 81 and the recording heads 22 are lowered to the recording position at which the recording heads 22 are positioned in orientations in which the recording heads 22 are inclined at predetermined angles.

As illustrated in FIG. 15B, the conveyance unit housing 81 is formed in an arc shape, so that the recording heads 22 are to be lowered to different heights from each other. The head vertical movement mechanisms first lower the plurality of recording heads 22 to a predetermined position. In this embodiment, the predetermined position is a position at which the head holders 26 (or the recording heads 22) are detected by a position detecting sensor (not illustrated). Thereafter, the head vertical movement mechanisms move (e.g., lower) the recording heads 22 by different distances from the predetermined position, thereby moving the recording heads 22 to different heights from each other with respect to the conveyance unit housing 81 formed in an arc shape. Each of the recording heads 22 is lowered from the predetermined position so as to be inclined at a predetermined angle with respect to a horizontal plane.

Figure 15C:
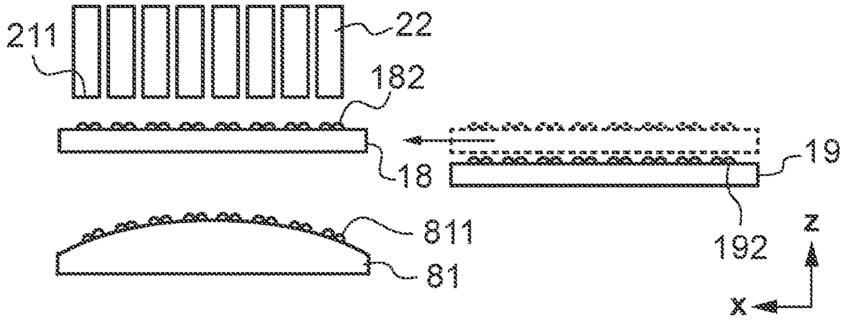

FIG. 15C illustrates a state in which the recording heads 22 move from the recording position to the retracted position and the cap tray 18 moves from its standby position to the capping position, from the state illustrated in FIG. 15B. Normally, when recording by the recording heads 22 is completed, a capping operation on the ink ejection surfaces of the recording heads 22 is performed by the cap mechanisms 181. Thus, when the recording is completed, the recording heads 22 rise from the recording position to the retracted position, and then the cap tray 18 moves horizontally downstream in the sheet conveyance direction (x direction) to the capping position at which the cap tray 18 faces the ink ejection surfaces of the recording heads 22.

Figure 15D:
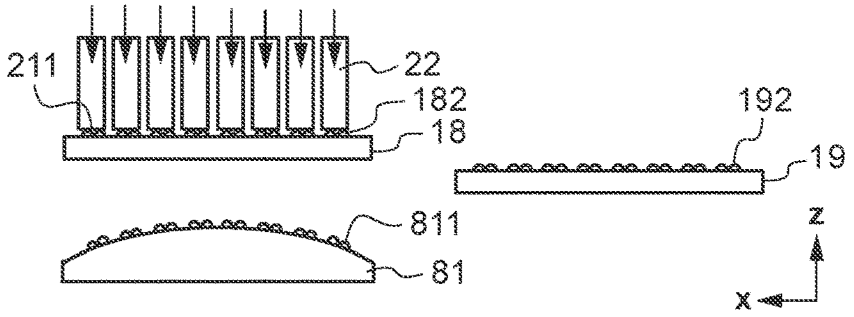

FIG. 15D illustrates a state in which the recording heads 22 have moved from the retracted position to a position where the recording heads 22 are to be capped, from the state illustrated in FIG. 15C. In short, FIG. 15D illustrates a capping state in which the recording heads 22 are capped by the cap mechanisms 181. Capping is performed when the recording heads 22 are lowered to the position where the recording heads 22 are to be capped and at which the contact portion 221 of each of the recording heads 22 is in contact with the corresponding recording head positioning portions 182 of the cap tray 18 and the recording head 22 is positioned.

FIG. 16A illustrates a state in which the recording heads 22 are at the retracted position and the cleaning tray 19 has moved from its standby position to the cleaning position. If a nozzle of the recording heads 22 is clogged, causing an ink ejection failure, a cleaning operation (maintenance operation) is performed on the recording heads 22 by the cleaning mechanisms 191.

When a cleaning operation is performed after a recording operation by the recording heads 22, first, the recording heads 22 are moved to the retracted position, and the cap tray 18 and the cleaning tray 19 are moved to their standby positions, which is the state illustrated in FIG. 15A. Thereafter, as illustrated in FIG. 16A, the cleaning tray 19 moves horizontally downstream in the sheet conveyance direction to the cleaning position at which the cleaning tray 19 faces the ink ejection surfaces of the recording heads 22.

FIG. 16B illustrates a state in which the recording heads 22 have moved to a maintenance position. In other words, FIG. 16B illustrates a state in which the recording heads 22 are cleaned by the cleaning mechanisms 191. From the state illustrated in FIG. 16A, the recording heads 22 are lowered to the maintenance position at which the contact portion 221 of each of the recording heads 22 is in contact with the corresponding recording head positioning portions 192 of the cleaning tray 19 and the recording head 22 is positioned, and then cleaning is performed.

<Flowchart of Operation of Recording Heads>

Figure 17:
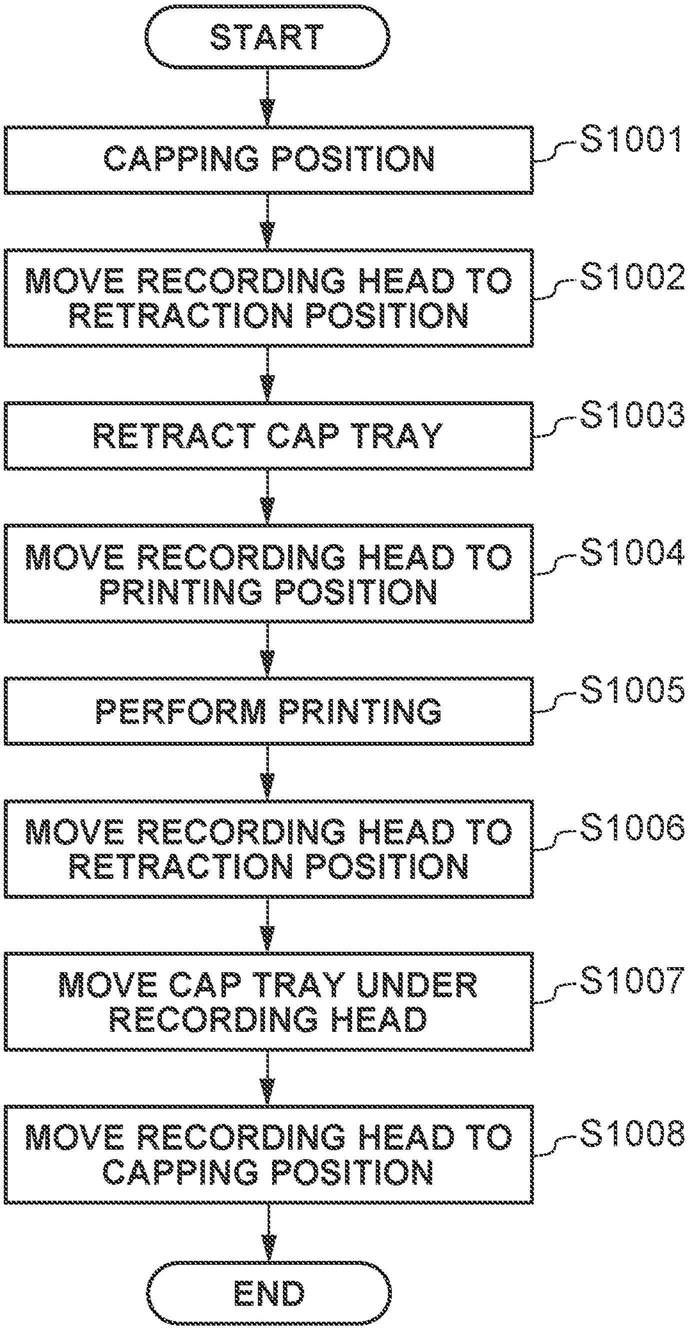
FIG. 17 is a flowchart for a positioning operation of the recording head during recording according to the first embodiment.

FIG. 17 is a flowchart for the positioning operation of the recording heads 22 in a recording operation. In step S1001, the recording heads 22 are positioned at the position where the recording heads 22 are to be capped (e.g., a capped position), and are capped by the cap mechanisms 181.

In step S1002, the recording head movement unit control unit 408 drives a motor (not illustrated) for raising and lowering the head holders 26 to move (e.g., raise) the recording heads 22 from the capped position to the retracted position.

In step S1003, the maintenance control unit 410 drives a motor (not illustrated) for moving the cap tray 18. Thus, the cap tray 18 is moved horizontally in the sheet conveyance direction from the capping position to its standby position along the rails 32.

In step S1004, the recording head movement unit control unit 408 drives a motor (not illustrated) for vertically moving the head holders 26 and moves (e.g., lowers) the recording heads 22 from the retracted position to the recording position.

In step S1005, printing (e.g., recording) is performed on the sheet S by the recording heads 22. In step S1006, the recording head movement unit control unit 408 then drives the motor (not illustrated) for vertically moving the head holders 26 and moves (e.g., raises) the recording heads 22 from the recording position to the retracted position.

In step S1007, the maintenance control unit 410 drives the motor (not illustrated) for moving the cap tray 18. Thus, the cap tray 18 is moved horizontally in the sheet conveyance direction from its standby position to the capping position along the rails 32.

In step S1008, the recording head movement unit control unit 408 drives the motor (not illustrated) for vertically moving the head holders 26 and moves (e.g., lowers) the recording heads 22 from the retracted position to the position where the recording heads 22 are to be capped, and then the ink ejection surfaces are capped by the cap mechanisms 181. Thus, the positioning operation of the recording heads 22 in the recording operation is completed.

Figure 18:
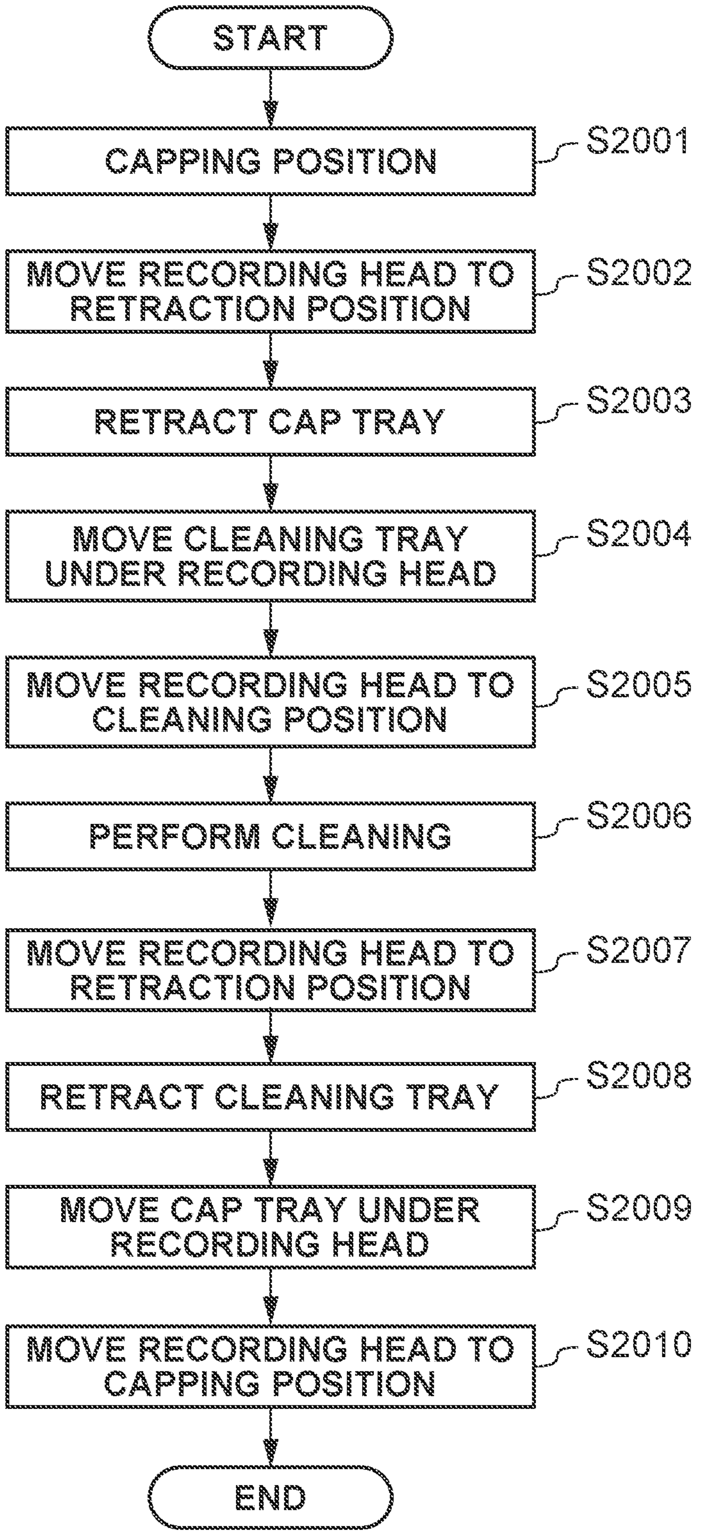
FIG. 18 is a flowchart for a positioning operation of the recording head during cleaning according to the first embodiment.

FIG. 18 is a flowchart for the positioning operation of the recording heads 22 in a cleaning operation. In step S2001, the recording heads 22 are positioned at the position where the recording heads 22 are to be capped, and are capped by the cap mechanisms 181.

In step S2002, the recording head movement unit control unit 408 drives the motor (not illustrated) for vertically moving the head holders 26 and moves (e.g., raises) the recording heads 22 from the capped position to the retracted position.

In step S2003, the maintenance control unit 410 drives the motor (not illustrated) for moving the cap tray 18. Thus, the cap tray 18 is moved horizontally in the sheet conveyance direction from the capping position to its standby position along the rails 32.

In step S2004, the maintenance control unit 410 drives the motor (not illustrated) for moving the cleaning tray 19, and the cleaning tray 19 then is moved horizontally in the sheet conveyance direction along the rails 32. By this horizontal movement, the cleaning tray 19 is moved to the cleaning position facing the ink ejection surfaces of the recording heads 22.

In step S2005, the recording head movement unit control unit 408 drives the motor (not illustrated) for vertically moving the head holders 26 and moves (e.g., lowers) the recording heads 22 from the retracted position to the maintenance position.

In step S2006, a cleaning operation is performed on the recording heads 22 by the cleaning mechanisms 191. After the completion of the cleaning operation, In step S2007, the recording head movement unit control unit 408 drives the motor (not illustrated) for vertically moving the head holders 26, and moves (e.g., raises) the recording heads 22 from the maintenance position to the retracted position.

In step S2008, the maintenance control unit 410 drives the motor (not illustrated) for moving the cleaning tray 19, and the cleaning tray 19 is moved horizontally in the sheet conveyance direction along the rails 32, thereby moving from the cleaning position to its standby position.

In step S2009, the maintenance control unit 410 drives the motor (not illustrated) for moving the cap tray 18, and the cap tray 18 is moved horizontally in the sheet conveyance direction along the rails 32, thereby moving from its standby position to the capping position.

In step S2010, the recording head movement unit control unit 408 drives the motor (not illustrated) for vertically moving the head holders 26, and moves (e.g., lowers) the recording heads 22 from the retracted position to the position where the recording heads 22 are to be capped, thereby completing the positioning operation of the recording heads in the cleaning operation.

As described above, when the recording heads 22 are capped by the cap mechanisms 181, the cap tray 18 alone of the maintenance unit 17 moves horizontally in the sheet conveyance direction to the capping position facing the ink ejection surfaces of the recording heads 22. On the other hand, the cleaning tray 19 of the maintenance unit 17 remains at its standby position, retracted upstream in the sheet conveyance direction with respect to the recording heads 22.

When the recording heads 22 are cleaned by the cleaning mechanisms 191, the cleaning tray 19 alone of the maintenance unit 17 moves horizontally in the sheet conveyance direction to the cleaning position facing the ink ejection surfaces of the recording heads 22. On the other hand, the cap tray 18 of the maintenance unit 17 remains at its standby position, retracted upstream in the sheet conveyance direction with respect to the recording heads 22.

As described above, the cap tray 18 and the cleaning tray 19 are configured to be independently movable, and the cap tray 18 and the cleaning tray 19 are configured to overlap each other in the z direction. In other words, the cap tray 18 and the cleaning tray 19 are disposed at different levels from each other in the z-direction.

This makes space under the cap tray 18 where the cleaning tray is movable, with the cap tray 18 at the capping position. The space between the cap tray 18 at the capping position and the conveyance unit housing 81, for example, serves as a work space for an operator to clean the conveyance unit housing 81 with the recording heads 22 capped.

In the above-described embodiment, the cap tray 18 is disposed directly above the cleaning tray 19 in the maintenance unit 17, but the cleaning tray 19 may be disposed directly above the cap tray 18. Similarly to the present embodiment, the configuration in this case provides a smaller size of the maintenance unit 17 in the apparatus rear direction.

As described above, the recording heads 22 according to the present embodiment is configured to move in the vertical direction (z direction) so as to move to the retracted position, the position where the recording heads 22 are to be capped, the maintenance position, and the recording position in this order from the top. In other words, the plurality of recording heads 22 do not move in the rear direction of the recording apparatus 1, providing a compact size of and allowing saving the space for the recording apparatus 1 in its rear direction.

Further, both the cap tray 18 and the cleaning tray 19 according to the present embodiment are configured to be disposed on the conveyance path of the sheet S and move horizontally in the sheet conveyance direction, and are configured not to move in the sheet width direction (y direction). This configuration saves the space for the recording apparatus 1 in its rear direction (y direction in the present embodiment).

Figure 19:
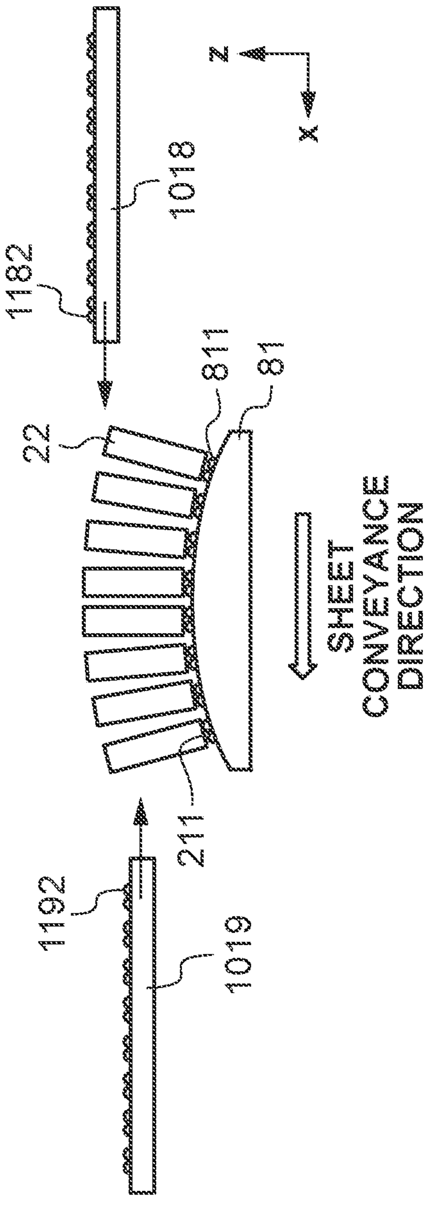
FIG. 19 illustrates a positioning operation of a recording head according to a second embodiment.

A second embodiment will be described. In the first embodiment, the configuration has been described in which the cap tray 18 and the cleaning tray 19 of the maintenance unit 17 are retracted from under the recording heads 22 to the upstream side in the sheet conveyance direction. In the second embodiment, as illustrated in FIG. 19, a cap tray 1018 is retracted to its standby position upstream of the recording heads 22 in the sheet conveyance direction, and a cleaning tray 1019 is retracted to its standby position downstream of the recording heads 22 in the sheet conveyance direction.

In this case, with the cap tray 1018 and the cleaning tray 1019 positioned at their standby positions, space is made over both of them. This space allows an operator to clean a cap mechanism 1182 and a cleaning mechanism 1192, for example. A configuration can have the same effect in which the cap tray 1018 is retracted downstream of the recording heads 22 in the sheet conveyance direction and the cleaning tray 1019 is retracted upstream of the recording heads 22 in the sheet conveyance direction.

Figure 20A:
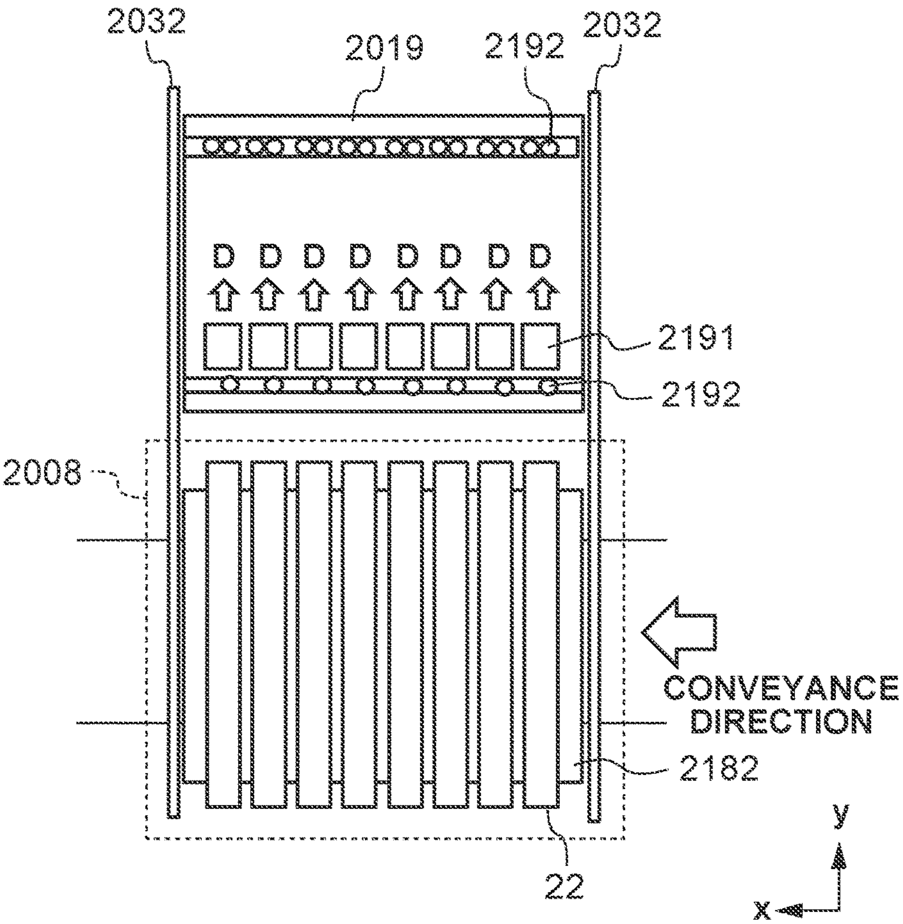
FIGS. 20A and 20B illustrate a positioning operation of a recording head according to a third embodiment.
Figure 20B:
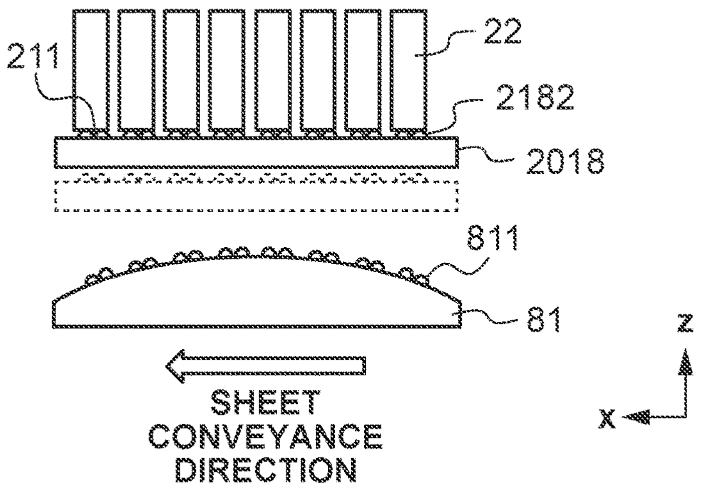

A third embodiment will be described. In the third embodiment, as illustrated in FIGS. 20A and 20A, a cap tray 2018 and a cleaning tray 2019 are retracted closer to the apparatus rear side in the sheet width direction (y direction) than the apparatus front side. FIG. 20A is a schematic top view of the main part including a recording unit 2008 of the recording apparatus 1 in a state where the recording heads 22 according to the present embodiment are capped by cap mechanisms 2182. FIG. 20B is a front view of the recording unit 2008 illustrated in FIG. 20A. As in the first embodiment, the cleaning tray 2019 includes a cleaning mechanism 2191 and a plurality of recording head positioning units 2192.

In the present embodiment, with the recording heads 22 capped by the cap mechanism 2182, space is made for the cleaning tray 2019 to move under the cap tray 2018 between the cap tray 2018 and the conveyance unit housing 81. This space serves as a work space for an operator, for example, to clean the conveyance unit housing 81.

Further, both the cap tray 2018 and the cleaning tray 2019 according to the present embodiment are configured to horizontally move in the sheet width direction along a plurality of rails 2032 and not to move in the sheet conveyance direction. Unlike the first embodiment, this configuration allows saving space in the lateral width direction (x direction) of the recording apparatus 1.

While the present invention has been described with reference to embodiments, it is to be understood that the invention is not limited to the disclosed embodiments. The scope of the following claims is to encompass all such modifications and equivalent structures and functions.

This application claims the benefit of Japanese Patent Application No. 2022-119994, filed Jul. 27, 2022, which is hereby incorporated by reference herein in its entirety.

What is claimed is:

1. A liquid ejection apparatus comprising:

a plurality of ejection heads, including a first ejection head and a second ejection head, configured to include ejection port surfaces in which ejection ports for ejecting liquid are arranged;

a plurality of head holders, including a first head holder for the first ejection head and a second head holder for the second ejection head, each configured to move the ejection head between a recording position for recording by the ejection head and a retracted position above the recording position;

a plurality of caps, including a first cap for the first ejection head and a second cap for the second ejection head, configured to be moved by a cap tray to a capping position where the respective ejection port surfaces are capped, and to an uncapped position where the respective ejection port surfaces are not capped;

a plurality of first positioning portions provided on the cap tray and configured to position one side of each ejection head in a longitudinal direction of each ejection head at the capping position;

a plurality of second positioning portions provided on the cap tray and configured to position another side of each ejection head in the longitudinal direction at the capping position; and a plurality of cleaning mechanisms configured to be moved by a cleaning tray, the cleaning tray being configured to move independently of the cap tray, to a cleaning position where the ejection heads are cleaned, and to a standby position where the ejection heads are not cleaned, wherein the cap tray at the uncapped position is positioned above the cleaning tray at the standby position, and wherein the first cap and the second cap are each arranged between the first positioning portion and the second positioning portion in the longitudinal direction.

2. The liquid ejection apparatus according to claim 1, wherein the cap tray at the uncapped position and the cleaning tray at the standby position overlap each other in a gravity direction.

3. The liquid ejection apparatus according to claim 1, further comprising a conveying unit configured to convey a recording medium, wherein the cap tray at the uncapped position is positioned above a conveyance path of the recording medium conveyed by the conveying unit.

4. The liquid ejection apparatus according to claim 1, further comprising a conveying tray configured to convey a recording medium, wherein the cleaning mechanism at the standby position is positioned above a conveyance path of the recording medium conveyed by the conveying unit.

5. The liquid ejection apparatus according to claim 1, further comprising a conveying unit configured to convey a recording medium in a conveyance direction, wherein the cap tray moves from the capping position to the uncapped position in the conveyance direction.

6. The liquid ejection apparatus according to claim 1, further comprising a conveying unit configured to convey a recording medium in a conveyance direction, wherein the cleaning tray moves from the cleaning position to the standby position in the conveyance direction.

7. The liquid ejection apparatus according to claim 1, further comprising a conveying unit configured to convey a recording medium in a conveyance direction, wherein the cap tray at the uncapped position is positioned upstream of the ejection head in the conveyance direction.

8. The liquid ejection apparatus according to claim 1, further comprising a conveying tray configured to convey a recording medium in a conveyance direction, wherein the cleaning mechanism at the standby position is positioned upstream of the ejection head in the conveyance direction.

9. The liquid ejection apparatus according to claim 1, further comprising:

a guide assembly configured to guide movement of the cap tray and the cleaning tray.

10. The liquid ejection apparatus according to claim 1, wherein each of the plurality of cleaning mechanisms includes a wiper configured to wipe the ejection port surface.

11. The liquid ejection apparatus according to claim 1, wherein each of the plurality of cleaning mechanisms includes a suction unit configured to suck the ejection ports.

12. The liquid ejection apparatus according to claim 1, wherein each of the plurality of ejection heads is a full-line head in which the ejection ports are arranged over a length corresponding to a width in a width direction of the recording medium, and wherein the cleaning tray moves in the width direction.

13. The liquid ejection apparatus according to claim 1, wherein the ejection head moves in the gravity direction.

14. The liquid ejection apparatus according to claim 13, wherein a first position of the ejection head at which the ejection port surface is capped with the cap is above a second position of the ejection head at which the ejection port surface is cleaned by the cleaning mechanism.

15. The liquid ejection apparatus according to claim 13, wherein a recording position at which the ejection head ejects the liquid onto a recording medium is below the second position.

16. The liquid ejection apparatus according to claim 1, wherein the first positioning portion and the second positioning portion each have a spherical shape.

* * * * *